US011032842B2

(12) United States Patent
Bai et al.

(10) Patent No.: US 11,032,842 B2
(45) Date of Patent: Jun. 8, 2021

(54) BEAM DETERMINATION TECHNIQUES IN BEAMFORMED WIRELESS COMMUNICATIONS

(71) Applicant: QUALCOMM Incorporated, San Diego, CA (US)

(72) Inventors: Tianyang Bai, Bridgewater, NJ (US); Junyi Li, Chester, NJ (US); Kiran Venugopal, Raritan, NJ (US); Jung Ho Ryu, Fort Lee, NJ (US); Makesh Pravin John Wilson, San Diego, CA (US); Tao Luo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/535,637

(22) Filed: Aug. 8, 2019

(65) Prior Publication Data

US 2020/0084793 A1     Mar. 12, 2020

Related U.S. Application Data

(60) Provisional application No. 62/728,545, filed on Sep. 7, 2018.

(51) Int. Cl.
*H04W 72/04*     (2009.01)
*H04W 72/12*     (2009.01)
*H04L 5/00*      (2006.01)

(52) U.S. Cl.
CPC ....... *H04W 72/1289* (2013.01); *H04L 5/0048* (2013.01); *H04W 72/046* (2013.01); *H04W 72/1205* (2013.01)

(58) Field of Classification Search
None
See application file for complete search history.

(56) References Cited

U.S. PATENT DOCUMENTS

2019/0349964 A1* 11/2019 Liou .................. H04W 72/1284
2020/0099432 A1*  3/2020 Maattanen ................ H04L 5/00
(Continued)

OTHER PUBLICATIONS

International Search Report and Written Opinion—PCT/US2019/046003—ISA/EPO—dated Dec. 16, 2019.
(Continued)

*Primary Examiner* — Brandon M Renner
(74) *Attorney, Agent, or Firm* — Holland & Hart LLP

(57) ABSTRACT

Methods, systems, and devices for wireless communications are described that provide beam determination in beamformed wireless communications. A base station may transmit multiple repetitions of control information for a subsequent scheduled transmission. A user equipment (UE) may receive one of the multiple repetitions, determine the control information, and adjust beamforming parameters for the scheduled transmission. The UE may have a scheduling threshold that corresponds to a time needed for the UE to adjust beamforming parameters for the scheduled transmission, and the UE may identify the beamforming parameters for the scheduled transmission from any one of the multiple repetitions of control information, which may be transmitted using different downlink transmission beams, before or after the scheduling threshold, or combinations thereof.

30 Claims, 23 Drawing Sheets

(56) References Cited

U.S. PATENT DOCUMENTS

| | | | |
|---|---|---|---|
| 2020/0177266 A1* | 6/2020 | Kang | H04W 72/046 |
| 2020/0274606 A1* | 8/2020 | Kang | H04W 24/10 |
| 2020/0359366 A1* | 11/2020 | Kim | H04W 72/04 |

OTHER PUBLICATIONS

Ericsson: "Feature Lead Surrunary for Beam Management—Thursday", 3GPP Draft, 3GPP TSG-RAN WG1 Meeting #94, R1-1809864 Feature Lead Summary Beam Management—Thursday, 3rd Generation Partnership Project (3GPP), Mobile Competence Centre, 650, Route Des Lucioles, F-06921 Sophia-Antipolis Cedex, vol. RAN WG1, No. Gothenburg, Aug. 20, 2018-Aug. 24, 2018, Aug. 23, 2018 (Aug. 23, 2018), XP051517219, 26 Pages, Retrieved from the Internet: URL:http://www.3gpp.org/ftp/tsg%5Fran/WG1%5FRL1/TSGR1%5F94/Docs/R1%2D1809864%2Ezip [retrieved on Aug. 23, 2018] the whole document.

Huawei et al., "Further Details on Beam Indication", 3GPP Draft, R1-1719806, 3GPP TSG RAN WG1 Meeting #91, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017 Nov. 17, 2017 (Nov. 17, 2017), XP051369186, 12 Pages, Retrieved from the Internet: URL:http://www.3gpp.org/ftp/tsg%5Fran/WG1%5FRL1/TSGR1%5F91/Docs/ [retrieved on Nov. 17, 2017] the whole document.

Interdigital et al., "Remaining Issues on Beam Management", 3GPP Draft, 3GPP TSG RAN WG1 Meeting #92, R1-1802620 Beam Management Final, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051398058, 6 Pages, Retrieved from the Internet: URL:http://www.3gpp.org/ftp/tsg%5Fran/WG1%5FRL1/TSGR1%5F92/Docs/ [retrieved on Feb. 17, 2018] the whole document.

NTT Docomo: "Remaining Issues on Beam Indication", 3GPP Draft, 3GPP TSG RAN WG1 Meeting AH 1801, R1-1800660 Beam Management, 3rd Generation Partnership Project (3GPP) Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 13, 2018 (Jan. 13, 2018), XP051384982, pp. 1-5, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018] the whole document.

Partial International Search Report—PCT/US2019/046003—ISA/EPO—dated Oct. 22, 2019.

* cited by examiner

BEAM DETERMINATION TECHNIQUES IN BEAMFORMED WIRELESS COMMUNICATIONS

CROSS REFERENCE

The present Application for Patent claims the benefit of U.S. Provisional Patent Application No. 62/728,545 by BAI et al., entitled "BEAM DETERMINATION TECHNIQUES IN BEAMFORMED WIRELESS COMMUNICATIONS," filed Sep. 7, 2018, assigned to the assignee hereof, and expressly incorporated by reference in its entirety herein.

BACKGROUND

The following relates generally to wireless communications, and more specifically to beam determination techniques in beamformed wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, wireless devices (e.g., base stations, UEs) may use beamformed signals for transmission and/or reception of wireless communications. For example, a base station may utilize beamformed (or precoded) transmissions to provide directional transmissions that may mitigate path losses that may be experienced by non-beamformed transmissions which may have a relatively wide beam or omni-directional transmission pattern (e.g., if the communications use higher frequencies, such as millimeter wave (mmW) frequencies). For example, a UE that includes multiple antennas may receive transmissions from a base station using various antenna configurations that determine a transmission beam. In some cases, a base station may provide an indication to a UE of a particular transmission beam that is to be used for a transmission, and the UE may use such an indication to set beamforming parameters for beamformed communications with the base station. In the event that a base station and a UE use different beamforming parameters for a transmission (e.g., the UE uses receive beamforming parameters that do not correspond with a transmission beam used by the base station for a downlink transmission), the transmission may be lost. Techniques that may enable reliable determination of transmission beams may thus enhance network efficiency.

SUMMARY

The described techniques relate to improved methods, systems, devices, and apparatuses that support beam determination in beamformed wireless communications. Various described techniques provide for a base station to provide multiple repetitions of control information for a subsequent scheduled transmission. A user equipment (UE) may receive one of the multiple repetitions, determine the control information, and adjust beamforming parameters for the scheduled transmission. In some cases, the UE may have a scheduling threshold that corresponds to a time needed for the UE to adjust beamforming parameters for the scheduled transmission. Further, in some cases, one or more of the multiple repetitions of control information may be transmitted after the scheduling threshold. Various techniques provided herein allow a UE to identify the beamforming parameters for the scheduled transmission from any one of the multiple repetitions of control information, which may be transmitted using different downlink transmission beams, before or after the scheduling threshold, or combinations thereof.

In some cases, the UE may use a predefined beam when control information is received after the scheduling threshold. In such cases, if the base station schedules different repetitions of the control information to be transmitted both before and after the scheduling threshold, the base station may indicate the predefined beam in repetitions transmitted prior to the scheduling threshold. In some cases, the control information may include an explicit indication of the transmission beam for the scheduled transmission, and each repetition of the control information may include the same indication. In cases where one or more repetitions are transmitted after the scheduling threshold, the explicit indication may indicate the predefined beam.

In some cases, the transmission beam for the scheduled transmission may be indicated based on a particular downlink beam that is used to transmit the control information. In such cases, a same downlink transmission beam may be used to transmit multiple repetitions of the control information before the scheduling threshold. In cases where one or more repetitions of the control information are transmitted after the scheduling threshold, any repetitions transmitted prior to the scheduling threshold may be transmitted using a downlink transmission beam that is associated with the predefined beam (e.g., using a downlink transmission beam that is quasi-co-located (QCL) with a receive beam to be used for the scheduled transmission). In some cases, the base station may provide an indication to the UE that repetitions of control information are transmitted, and the UE may use a rule to determine the transmission beam for the scheduled transmission (e.g., use the predefined beam irrespective of a downlink transmission beam used to transmit the control information).

A method of wireless communication at a base station is described. The method may include establishing communications with a UE using a first pair of beamformed transmission beams, the first pair of beamformed transmission beams including a first downlink beam for transmissions from the base station to the UE and a first receive beam for receiving the first downlink beam at the UE, transmitting a set of repetitions of control information to the UE that each include a same set of resources and provide an indication of a second beam pair for a scheduled transmission with the UE, determining a scheduling threshold for the UE that corresponds to a time in advance of a start time of the set of resources for the UE to change from the first receive beam to a second beam for the scheduled transmission, identifying a predetermined beam pair that is used for the scheduled transmission based on control information transmitted to the UE after the scheduling threshold, and setting the indication of the second beam pair based on whether one or more of the set of repetitions is transmitted after the scheduling threshold.

An apparatus for wireless communication at a base station is described. The apparatus may include a processor, memory in electronic communication with the processor, and instructions stored in the memory. The instructions may be executable by the processor to cause the apparatus to establish communications with a UE using a first pair of beamformed transmission beams, the first pair of beamformed transmission beams including a first downlink beam for transmissions from the base station to the UE and a first receive beam for receiving the first downlink beam at the UE, transmit a set of repetitions of control information to the UE that each include a same set of resources and provide an indication of a second beam pair for a scheduled transmission with the UE, determine a scheduling threshold for the UE that corresponds to a time in advance of a start time of the set of resources for the UE to change from the first receive beam to a second beam for the scheduled transmission, identify a predetermined beam pair that is used for the scheduled transmission based on control information transmitted to the UE after the scheduling threshold, and set the indication of the second beam pair based on whether one or more of the set of repetitions is transmitted after the scheduling threshold.

Another apparatus for wireless communication at a base station is described. The apparatus may include means for establishing communications with a UE using a first pair of beamformed transmission beams, the first pair of beamformed transmission beams including a first downlink beam for transmissions from the base station to the UE and a first receive beam for receiving the first downlink beam at the UE, transmitting a set of repetitions of control information to the UE that each include a same set of resources and provide an indication of a second beam pair for a scheduled transmission with the UE, determining a scheduling threshold for the UE that corresponds to a time in advance of a start time of the set of resources for the UE to change from the first receive beam to a second beam for the scheduled transmission, identifying a predetermined beam pair that is used for the scheduled transmission based on control information transmitted to the UE after the scheduling threshold, and setting the indication of the second beam pair based on whether one or more of the set of repetitions is transmitted after the scheduling threshold.

A non-transitory computer-readable medium storing code for wireless communication at a base station is described. The code may include instructions executable by a processor to establish communications with a UE using a first pair of beamformed transmission beams, the first pair of beamformed transmission beams including a first downlink beam for transmissions from the base station to the UE and a first receive beam for receiving the first downlink beam at the UE, transmit a set of repetitions of control information to the UE that each include a same set of resources and provide an indication of a second beam pair for a scheduled transmission with the UE, determine a scheduling threshold for the UE that corresponds to a time in advance of a start time of the set of resources for the UE to change from the first receive beam to a second beam for the scheduled transmission, identify a predetermined beam pair that is used for the scheduled transmission based on control information transmitted to the UE after the scheduling threshold, and set the indication of the second beam pair based on whether one or more of the set of repetitions is transmitted after the scheduling threshold.

In some examples of the method, apparatuses, and non-transitory computer-readable medium described herein, the set of repetitions of control information may be transmitted using at least two different downlink beams.

Some examples of the method, apparatuses, and non-transitory computer-readable medium described herein may further include operations, features, means, or instructions for scheduling at least one of the set of repetitions to be transmitted after the scheduling threshold and setting the indication of the second beam pair to be the predetermined beam pair. In some examples of the method, apparatuses, and non-transitory computer-readable medium described herein, the predetermined beam pair corresponds to a lowest beam pair identification (ID) in a control resource set (CORESET) associated with a prior transmission slot.

In some examples of the method, apparatuses, and non-transitory computer-readable medium described herein, the indication of the second beam pair for the scheduled transmission may be based on a downlink beam used to transmit the control information, and where the method further may include operations, features, means, or instructions for scheduling at least one of the set of repetitions to be transmitted after the scheduling threshold and transmitting a first repetition of the set of repetitions in advance of the scheduling threshold using a second downlink beam that corresponds to the predetermined beam pair.

Some examples of the method, apparatuses, and non-transitory computer-readable medium described herein may further include operations, features, means, or instructions for transmitting a repetition indicator that signals the set of repetitions may be transmitted, and where the second beam pair may be identified based on the repetition indicator. In some examples of the method, apparatuses, and non-transitory computer-readable medium described herein, the repetition indicator may be included with the control information in each of the set of repetitions. In some examples of the method, apparatuses, and non-transitory computer-readable medium described herein, the second beam pair may be identified based on the repetition indicator irrespective of which of at least two different downlink beams provides the control information. In some examples of the method, apparatuses, and non-transitory computer-readable medium described herein, the second beam pair corresponds to a lowest beam pair ID in a CORESET associated with a prior transmission slot.

In some examples of the method, apparatuses, and non-transitory computer-readable medium described herein, the scheduled transmission includes one or more physical downlink shared channel (PDSCH) transmissions, one or more aperiodic channel state information reference signal (AP-CSI-RS) transmissions, or combinations thereof.

A method of wireless communication at a base station is described. The method may include determining a scheduling threshold for a UE that corresponds to a time in advance of a start time of a transmission to the UE for the UE to change from a first receive beam to a second beam for communicating the transmission, the first receive beam associated with a first beam pair that includes a first downlink beam and the first receive beam, and the second beam associated with a second beam pair that includes a second base station beam and the second beam, transmitting a set of repetitions of control information to the UE that each include a same set of resources for a scheduled transmission with the UE and provide an indication of the second beam pair for the scheduled transmission, where each of the set of repetitions are transmitted in advance of the scheduling threshold, and communicating the scheduled transmission with the UE via the second beam pair.

An apparatus for wireless communication at a base station is described. The apparatus may include a processor, memory in electronic communication with the processor, and instructions stored in the memory. The instructions may be executable by the processor to cause the apparatus to determine a scheduling threshold for a UE that corresponds to a time in advance of a start time of a transmission to the UE for the UE to change from a first receive beam to a second beam for communicating the transmission, the first receive beam associated with a first beam pair that includes a first downlink beam and the first receive beam, and the second beam associated with a second beam pair that includes a second base station beam and the second beam, transmit a set of repetitions of control information to the UE that each include a same set of resources for a scheduled transmission with the UE and provide an indication of the second beam pair for the scheduled transmission, where each of the set of repetitions are transmitted in advance of the scheduling threshold, and communicate the scheduled transmission with the UE via the second beam pair.

Another apparatus for wireless communication at a base station is described. The apparatus may include means for determining a scheduling threshold for a UE that corresponds to a time in advance of a start time of a transmission to the UE for the UE to change from a first receive beam to a second beam for communicating the transmission, the first receive beam associated with a first beam pair that includes a first downlink beam and the first receive beam, and the second beam associated with a second beam pair that includes a second base station beam and the second beam, transmitting a set of repetitions of control information to the UE that each include a same set of resources for a scheduled transmission with the UE and provide an indication of the second beam pair for the scheduled transmission, where each of the set of repetitions are transmitted in advance of the scheduling threshold, and communicating the scheduled transmission with the UE via the second beam pair.

A non-transitory computer-readable medium storing code for wireless communication at a base station is described. The code may include instructions executable by a processor to determine a scheduling threshold for a UE that corresponds to a time in advance of a start time of a transmission to the UE for the UE to change from a first receive beam to a second beam for communicating the transmission, the first receive beam associated with a first beam pair that includes a first downlink beam and the first receive beam, and the second beam associated with a second beam pair that includes a second base station beam and the second beam, transmit a set of repetitions of control information to the UE that each include a same set of resources for a scheduled transmission with the UE and provide an indication of the second beam pair for the scheduled transmission, where each of the set of repetitions are transmitted in advance of the scheduling threshold, and communicate the scheduled transmission with the UE via the second beam pair.

In some examples of the method, apparatuses, and non-transitory computer-readable medium described herein, the indication for the second beam pair may be based on a downlink beam that provides the control information, where the second beam pair corresponds to a beam pair that corresponds to or may be quasi-co-located (QCL) with the downlink beam that provides the control information.

In some examples of the method, apparatuses, and non-transitory computer-readable medium described herein, each of the set of repetitions of control information may be transmitted within a same transmission slot. Some examples of the method, apparatuses, and non-transitory computer-readable medium described herein may further include two or more of the set of repetitions of control information may be transmitted in different transmission slots and each provide the indication of the second beam pair. In some examples of the method, apparatuses, and non-transitory computer-readable medium described herein, the set of repetitions of control information may be transmitted using at least two different downlink beams, and where the indication for the second beam pair may be an explicit indication of the second beam pair.

A method of wireless communication at a base station is described. The method may include determining a scheduling threshold for a UE that corresponds to a time in advance of a start time of a transmission to the UE for the UE to change from a first receive beam to a second beam for communicating the transmission, the first receive beam associated with a first beam pair that includes a first downlink beam and the first receive beam, and the second receive beam associated with a second beam pair that includes a second beam and the second base station beam, and where the UE uses a predefined beam pair responsive to control information transmitted to the UE after the scheduling threshold, transmitting a set of repetitions of control information to the UE that each include a same set of resources for a scheduled transmission with the UE, where the set of repetitions of control information are transmitted after the scheduling threshold, and communicating the scheduled transmission with the UE via the predefined beam pair.

An apparatus for wireless communication at a base station is described. The apparatus may include a processor, memory in electronic communication with the processor, and instructions stored in the memory. The instructions may be executable by the processor to cause the apparatus to determine a scheduling threshold for a UE that corresponds to a time in advance of a start time of a transmission to the UE for the UE to change from a first receive beam to a second beam for communicating the transmission, the first receive beam associated with a first beam pair that includes a first downlink beam and the first receive beam, and the second receive beam associated with a second beam pair that includes a second beam and the second base station beam, and where the UE uses a predefined beam pair responsive to control information transmitted to the UE after the scheduling threshold, transmit a set of repetitions of control information to the UE that each include a same set of resources for a scheduled transmission with the UE, where the set of repetitions of control information are transmitted after the scheduling threshold, and communicate the scheduled transmission with the UE via the predefined beam pair.

Another apparatus for wireless communication at a base station is described. The apparatus may include means for determining a scheduling threshold for a UE that corresponds to a time in advance of a start time of a transmission to the UE for the UE to change from a first receive beam to a second beam for communicating the transmission, the first receive beam associated with a first beam pair that includes a first downlink beam and the first receive beam, and the second receive beam associated with a second beam pair that includes a second beam and the second base station beam, and where the UE uses a predefined beam pair responsive to control information transmitted to the UE after the scheduling threshold, transmitting a set of repetitions of control information to the UE that each include a same set of resources for a scheduled transmission with the UE, where the set of repetitions of control information are transmitted after the scheduling threshold, and communicating the scheduled transmission with the UE via the predefined beam pair.

A non-transitory computer-readable medium storing code for wireless communication at a base station is described. The code may include instructions executable by a processor to determine a scheduling threshold for a UE that corresponds to a time in advance of a start time of a transmission to the UE for the UE to change from a first receive beam to a second beam for communicating the transmission, the first receive beam associated with a first beam pair that includes a first downlink beam and the first receive beam, and the second receive beam associated with a second beam pair that includes a second beam and the second base station beam, and where the UE uses a predefined beam pair responsive to control information transmitted to the UE after the scheduling threshold, transmit a set of repetitions of control information to the UE that each include a same set of resources for a scheduled transmission with the UE, where the set of repetitions of control information are transmitted after the scheduling threshold, and communicate the scheduled transmission with the UE via the predefined beam pair.

In some examples of the method, apparatuses, and non-transitory computer-readable medium described herein, each of the set of repetitions of control information may be transmitted within a same transmission slot. In some examples of the method, apparatuses, and non-transitory computer-readable medium described herein, the predefined beam pair corresponds to a lowest beam ID in a CORESET associated with a prior transmission slot.

In some examples of the method, apparatuses, and non-transitory computer-readable medium described herein, the UE selects the second beam based on the first downlink beam being used to transmit the control information when the control information may be transmitted after the scheduling threshold and ambiguity associated with two or more different downlink beams used to transmit the set of repetitions may be removed based on each of the set of repetitions being transmitted after the scheduling threshold.

In some examples of the method, apparatuses, and non-transitory computer-readable medium described herein, the set of repetitions of control information may be transmitted using at least two different downlink beams. In some examples of the method, apparatuses, and non-transitory computer-readable medium described herein, the scheduled transmission includes one or more PDSCH transmissions, one or more AP-CSI-RS transmissions, or combinations thereof.

A method of wireless communication at a UE is described. The method may include establishing communications with a base station using a first pair of beamformed transmission beams, the first pair of beamformed transmission beams including a first downlink beam for transmissions from the base station to the UE and a first receive beam for receiving the first downlink beam at the UE, receiving a repetition indication from the base station that indicates that control information from the base station is transmitted in a set of repetitions, where each repetition of the control information indicates a same set of resources for a scheduled transmission from the base station, and determining a second beam pair for the scheduled transmission based on the repetition indication.

An apparatus for wireless communication at a UE is described. The apparatus may include a processor, memory in electronic communication with the processor, and instructions stored in the memory. The instructions may be executable by the processor to cause the apparatus to establish communications with a base station using a first pair of beamformed transmission beams, the first pair of beamformed transmission beams including a first downlink beam for transmissions from the base station to the UE and a first receive beam for receiving the first downlink beam at the UE, receive a repetition indication from the base station that indicates that control information from the base station is transmitted in a set of repetitions, where each repetition of the control information indicates a same set of resources for a scheduled transmission from the base station, and determine a second beam pair for the scheduled transmission based on the repetition indication.

Another apparatus for wireless communication at a UE is described. The apparatus may include means for establishing communications with a base station using a first pair of beamformed transmission beams, the first pair of beamformed transmission beams including a first downlink beam for transmissions from the base station to the UE and a first receive beam for receiving the first downlink beam at the UE, receiving a repetition indication from the base station that indicates that control information from the base station is transmitted in a set of repetitions, where each repetition of the control information indicates a same set of resources for a scheduled transmission from the base station, and determining a second beam pair for the scheduled transmission based on the repetition indication.

A non-transitory computer-readable medium storing code for wireless communication at a UE is described. The code may include instructions executable by a processor to establish communications with a base station using a first pair of beamformed transmission beams, the first pair of beamformed transmission beams including a first downlink beam for transmissions from the base station to the UE and a first receive beam for receiving the first downlink beam at the UE, receive a repetition indication from the base station that indicates that control information from the base station is transmitted in a set of repetitions, where each repetition of the control information indicates a same set of resources for a scheduled transmission from the base station, and determine a second beam pair for the scheduled transmission based on the repetition indication.

Some examples of the method, apparatuses, and non-transitory computer-readable medium described herein may further include operations, features, means, or instructions for determining the second beam pair based on a lowest beam pair ID in a CORESET associated with a prior transmission slot. In some examples of the method, apparatuses, and non-transitory computer-readable medium described herein, the set of repetitions of the control information may be transmitted using at least two different downlink beams. In some examples of the method, apparatuses, and non-transitory computer-readable medium described herein, the scheduled transmission includes one or more PDSCH transmissions, one or more AP-CSI-RS transmissions, or combinations thereof.

DETAILED DESCRIPTION

Figure 1:
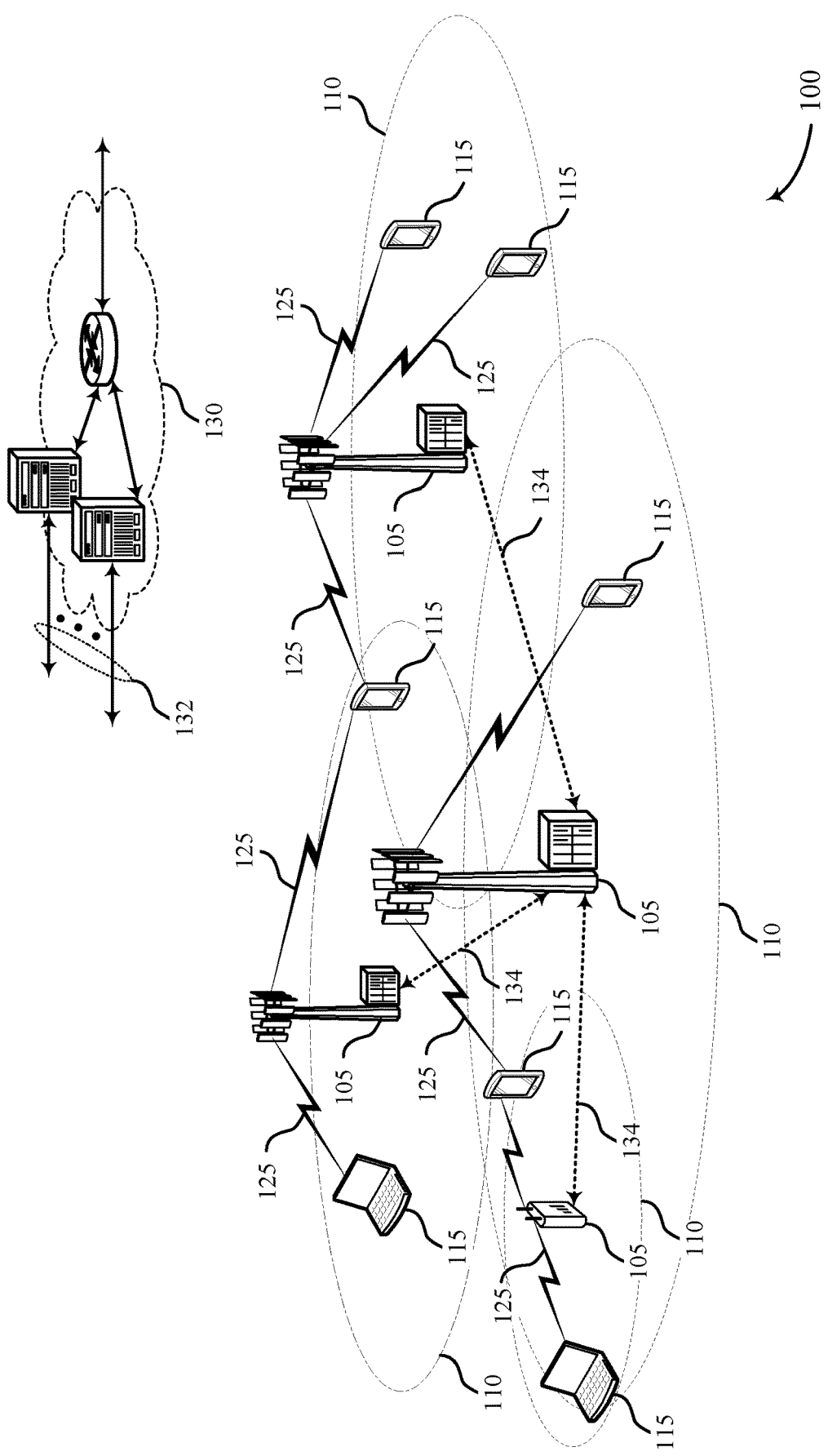
FIG. 1 illustrates an example of a system for wireless communications that supports beam determination techniques in beamformed wireless communications in accordance with aspects of the present disclosure.

Various aspects of the present disclosure provide beam determination techniques in beamformed wireless communications. In some cases, a base station may transmit multiple repetitions of control information for a subsequent scheduled transmission, and a user equipment (UE) may receive one of the multiple repetitions and identify parameters and resources for the scheduled transmission. For example, the base station may transmit multiple repetitions of control information that each indicate a same set of resources for the scheduled transmission (e.g., downlink resources for a scheduled downlink transmission to the UE using an identified downlink transmission beam). The UE may receive one of the repetitions of control information and determine the set of resources and beamforming parameters for the scheduled transmission. In some cases, the UE may have a scheduling threshold that corresponds to a time needed for the UE to adjust beamforming parameters for the scheduled transmission, and the base station may transmit the multiple repetitions of the control information in a manner that avoids ambiguity in the transmission beam that is to be used for the scheduled transmission. In some cases, one or more of the multiple repetitions of control information may be transmitted after the scheduling threshold. Various techniques provided herein allow a UE to identify the beamforming parameters for the scheduled transmission from any one of the multiple repetitions of control information, which may be transmitted using different downlink transmission beams, before or after the scheduling threshold, or combinations thereof.

In some cases, the UE may use a predefined beam when control information is received after the scheduling threshold. In such cases, if the base station schedules different repetitions of the control information to be transmitted both before and after the scheduling threshold, the base station may indicate the predefined beam in repetitions transmitted prior to the scheduling threshold. In some cases, the control information may include an explicit indication of the transmission beam for the scheduled transmission, and each repetition of the control information may include the same indication. In cases where one or more repetitions are transmitted after the scheduling threshold, the explicit indication may indicate the predefined beam. In some cases, the base station may be constrained to schedule each of the repetitions of the control information within a certain time period, such as within a transmission slot or within a certain number of symbols, such that each repetition of the control information is located either before or after the scheduling threshold. In cases where each repetition is before the scheduling threshold, each the explicit indication of the transmission beam may be the same in each repetition and may be different than the predefined beam. In cases where each repetition is after the scheduling threshold, the UE may use the predefined beam irrespective of any explicit indication that is provided.

In some cases, the transmission beam for the scheduled transmission may be indicated based on a particular downlink beam that is used to transmit the control information. In such cases, a same downlink transmission beam may be used to transmit multiple repetitions of the control information before the scheduling threshold. In cases where one or more repetitions of the control information are transmitted after the scheduling threshold, any repetitions transmitted prior to the scheduling threshold may be transmitted using a downlink transmission beam that is associated with the predefined beam (e.g., using a downlink transmission beam that is quasi-co-located (QCL) with a receive beam to be used for the scheduled transmission). In some cases, the base station may provide an indication to the UE that repetitions of control information are transmitted, and the UE may use a rule to determine the transmission beam for the scheduled transmission (e.g., use the predefined beam irrespective of a downlink transmission beam used to transmit the control information).

Thus, various described techniques provide enhanced reliability for control information transmissions. Such enhanced reliability may result in fewer instances where the UE misses control information with scheduling information, and thus helps enhance overall network efficiency and reliability. Further, power consumption may be reduced through fewer retransmissions and reduced searching at the UE.

Aspects of the disclosure are initially described in the context of a wireless communications system. Various examples of control information transmissions and associated scheduled transmissions using beamformed transmission beams are then discussed. Aspects of the disclosure are further illustrated by and described with reference to apparatus diagrams, system diagrams, and flowcharts that relate to beam determination techniques in beamformed wireless communications.

FIG. 1 illustrates an example of a wireless communications system 100 that supports beam determination techniques in beamformed wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, base stations 105 and UEs 115 may use beamformed transmission beams for communications.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions). In some cases, base station 105 transmit beams that correspond to particular receive beams at a UE 115, may be referred to as beam pairs, and a receive beam at the UE 115 may be quasi-co-located (QCL) with the corresponding transmit beam of the base station 105. In some cases, a single receive beam may be QCL with multiple downlink transmission beams of a base station 105.

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may, in some cases, perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In cases where base stations 105 and UEs 115 use beamformed communications, control information may be transmitted to UEs 115 using such beamformed communications. In some cases, a base station 105 may transmit multiple repetitions of control information for a subsequent scheduled transmission, and a UE 115 may receive one of the multiple repetitions and identify parameters and resources for the scheduled transmission. The UE 115 may receive one of the repetitions of control information and determine the set of resources and beamforming parameters for the scheduled transmission. Various aspects of the present disclosure provide techniques for indicating a transmission beam that the UE 115 is to use for the scheduled transmission.

Figure 2:
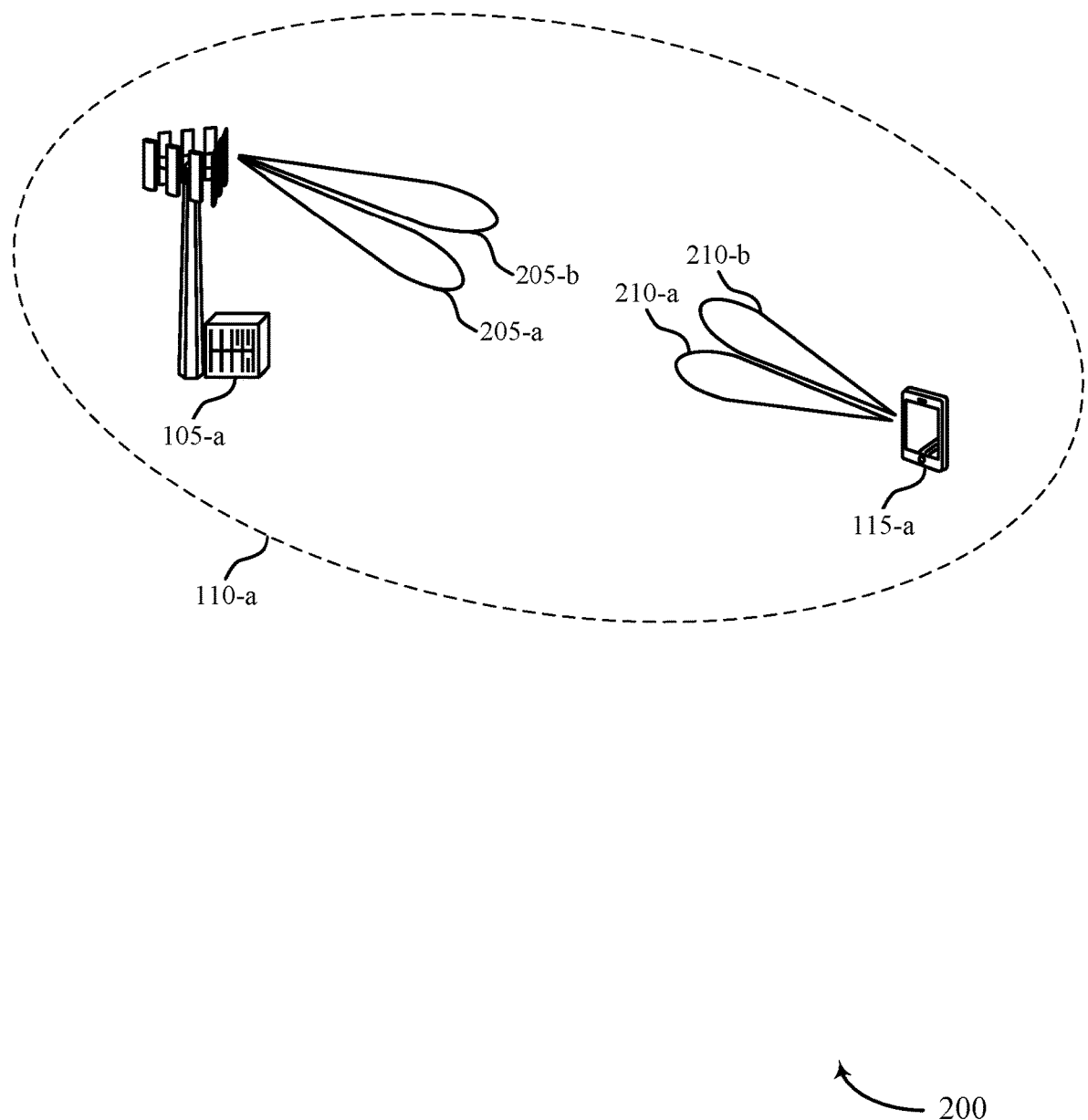
FIG. 2 illustrates an example of a portion of a wireless communications system that supports beam determination techniques in beamformed wireless communications in accordance with aspects of the present disclosure.

FIG. 2 illustrates an example of a wireless communications system 200 that supports beam determination techniques in beamformed wireless communications in accordance with aspects of the present disclosure. In some examples, wireless communications system 200 may implement aspects of wireless communications system 100. The wireless communications system 200 may include base station 105-a and UE 115-a, which may be examples of a base station 105 and a UE 115, as described with reference to FIG. 1.

Base station 105-a may provide network coverage for geographic coverage area 110-a. Base station 105-a and UE 115-a may communicate using beamformed or directional transmissions. For example, in downlink communications, base station 105-a may transmit downlink transmissions to UE 115-a using a beamformed downlink transmission beam 205, which may be one of a number of downlink transmission beams used by the base station 105-a, such as a first downlink transmission beam 205-a and a second downlink transmission beam 205-b. The UE 115-a may apply beamforming parameters or use beamforming processing to receive components such that signals along a receive beam 210 are amplified and processed. For example, UE 115-a may apply a first set of beamforming parameters to a receive chain to receive signals corresponding to first receive beam 210-a and may apply a second set of beamforming parameters to the receive chain to receive signals corresponding to second receive beam 210-b.

As discussed herein, in cases where the base station 105-a uses the first downlink transmission beam 205-a to transmit a downlink transmission to the UE 115-a, the UE 115-a may use the first receive beam 210 to receive the downlink transmission. In some cases, the first downlink transmission beam 205-a and the first receive beam 210-a may be a beam pair in which the first receive beam 210-a is QCL with the first downlink transmission beam 205-a. In this example, the second receive beam 210-b may be QCL with the second downlink transmission beam 205-b. In some cases, multiple beam pairs may be established through one or more beam sweep procedures performed by the base station 105-a and the UE 115-a (e.g., through one or more P1, P2, or P3 procedures).

In some cases, the base station 105-a may allocate resources for downlink (or uplink) transmissions with the UE 115-a, and may signal the allocated resources in control information that is transmitted to the UE 115-a. For example, the base station 105-a may schedule a set of downlink resources to the UE 115-a for a downlink transmission, and may signal the scheduled transmission resources to the UE 115-a using downlink control information (DCI) in a physical downlink control channel (PDCCH) transmission. In some cases, the base station 105-a may also indicate a downlink transmission beam 205 that will be used to transmit the scheduled transmission, which the UE 115-a may use to determine which receive beam 210 to use to receive the scheduled transmission. In some cases, the indication of the beam for the scheduled transmission may be provided by a transmission configuration indicator (TCI) state that is transmitted with the control information. For example, the TCI state may be used in beam management as a label of the base station beam for the scheduled transmission. For example, if the base station 105-a informs the UE 115-a that the scheduled transmission will be sent through a beam labeled as TCI 0, then the UE 115-a will use an appropriate receive beam paired with TCI 0 beam to receive the scheduled transmission via the set of resources indicated in the control information. In other cases, TCI may not be explicitly indicated in control information, and instead the UE 115-a may determine the receive beam 210 based on the downlink transmission beam 205 used to transmit the control information. Additionally, whether to use the indicated beam or not may also depend on a time offset between the control information and a start of the scheduled transmission, which is discussed in more detail with respect to FIGS. 3A and 3B.

In some deployments, the base station 105-a and UE 115-a may experience beam blockage, which may result in relatively frequent beam changes. For example, an object (e.g., a user's hand or a piece of equipment) may obstruct a transmission path for a particular beam such that a different beam provides more reliable communications. In such cases the base station 105-a may signal allocated resources to the UE 115-a and the scheduled transmission beam to the UE 115-a in multiple repetitions of control information that may be transmitted on a same or different downlink transmission beam 205. In such cases, the UE 115-a may or may not be aware that repetitions of the control information are transmitted, as decoding any one repetition of the control information may provide the UE 115-a with sufficient information for the scheduled transmission. In cases where multiple repetitions are provided, aspects of the present disclosure provide techniques for unambiguous indication of the receive beam to use at the UE 115-a. Thus, reliability for the control information is enhanced, which results in fewer instances where the UE 115-a misses control information that provides scheduling information, and thus helps enhance overall network efficiency and reliability. Further, power consumption at the UE 115-a is reduced through fewer retransmissions and searching at the UE 115-a.

The scheduled transmissions may be, for example, physical downlink shared channel (PDSCH) transmissions or aperiodic channel state information reference signals (AP-CSI-RS) transmissions. Further, while various examples discuss downlink transmissions from base station 105-a to UE 115-a, various techniques such as discussed herein may also be applied to uplink transmissions from the UE 115-a to the base station 105-a. In such cases, an uplink beam used by the UE 115-a for uplink transmissions may be determined based on a scheduling threshold and an indicated uplink beam.

In some cases, the base station 105-a may identify a UE 115-a capability (e.g., based on a report signaling UE 115-a capability or a category of UE 115-a) and determine the scheduling threshold for the UE 115-a. The scheduling threshold may correspond to a minimum time from the UE 115-a receiving an indication of a beam of a transmission to the UE 115-a being able to apply to indicated beam, or a minimum time for the UE to change from a first beam to a second beam. The base station 105-a may transmit a number of repetitions of control information to the UE 115-a that each include a same set of resources and provide an indication of a beam pair for the scheduled transmission to the UE 115-a. The base station 105-a may also identify a predefined beam pair for the scheduled transmission. The base station 105-a may schedule at least one of the repetitions to be transmitted after the scheduling threshold, in which case the base station 105-a may set the indication of the beam pair for the second transmission to be the predetermined beam pair, thus avoiding ambiguity on the identification of the beam for the scheduled transmission. In some cases, the scheduled transmission may be a downlink transmission or an uplink transmission.

Figure 3A:
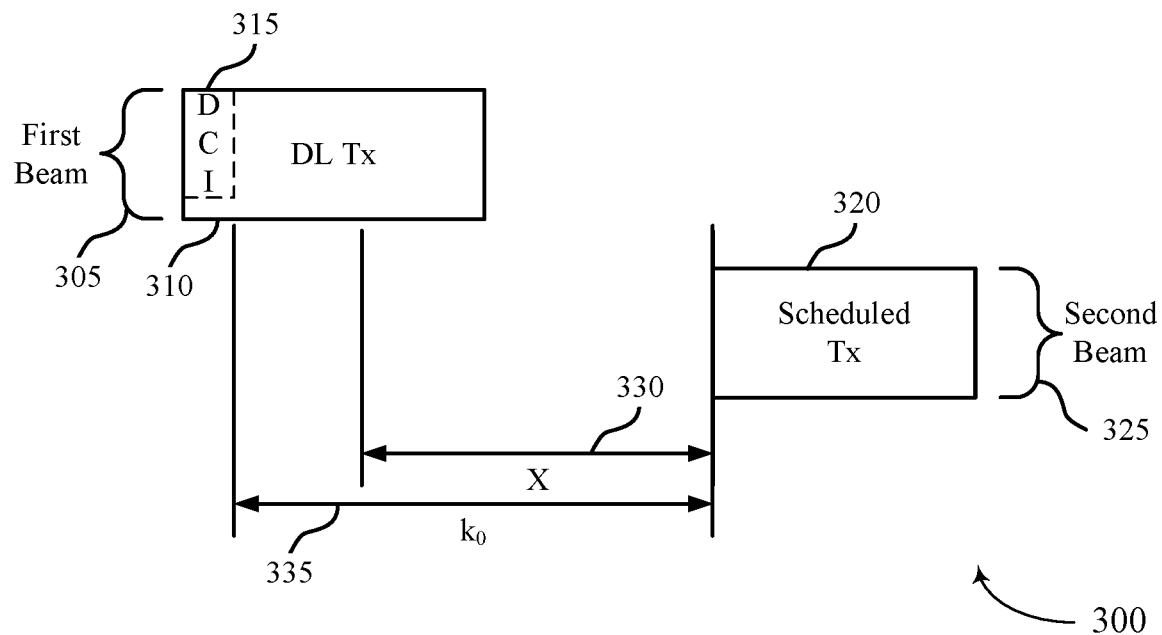
FIGS. 3A and 3B illustrate examples of transmission beams for control information and for scheduled transmissions that support beam determination techniques in beamformed wireless communications in accordance with aspects of the present disclosure.
Figure 3B:
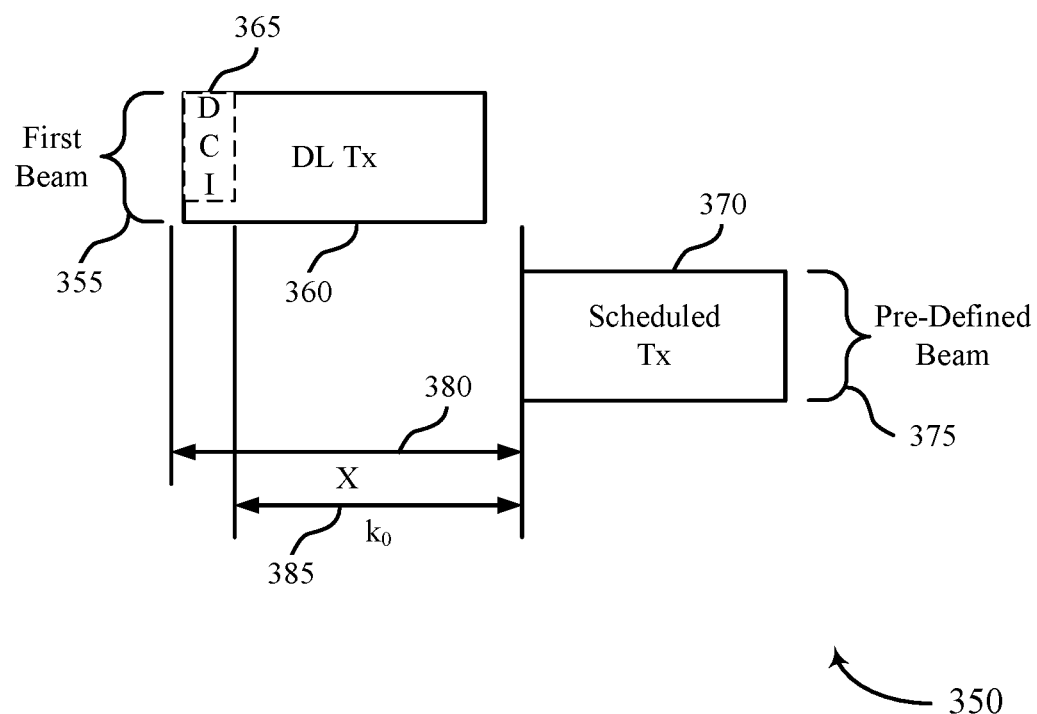

FIGS. 3A and 3B illustrate examples of transmission beams for control information and for scheduled transmissions 300 and 350 that support beam determination techniques in beamformed wireless communications in accordance with aspects of the present disclosure. In some examples, transmission beams for control information and for scheduled transmissions 300 and 350 may implement aspects of wireless communications system 100 or 200. In the example of FIG. 3A, a first beam 305 may be used by a base station to transmit a downlink transmission 310 that may include control information such as DCI 315. The DCI 315 may include a set of allocated resources for a subsequent scheduled transmission 320 that is transmitted via a second beam 325. For example, the scheduled transmission 320 may contain PDSCH data that is scheduled by a PDCCH in the downlink transmission 310.

As indicated above, in some cases, whether a UE is to use an indicated beam provided with control information may also depend on a time offset ($k_0$) 335 between the control DCI 315 information and a start of the scheduled transmission 320. In such cases, the UE may have a scheduling threshold (X) 330, which corresponds to an amount of time needed by the UE to configure receive circuitry for receiving the second beam 325. In some cases, the value of the scheduling threshold 330 may be based on a capability of the UE and switching speed that is supported. In some cases, the UE may provide an indication to the base station of the scheduling threshold (e.g., either explicitly by providing the scheduling threshold 330 or implicitly in a UE category or UE type that is signaled to the base station).

In some cases, an indication of the second beam 325 may be provided explicitly in the DCI 315. For example, a TCI beam for the scheduled transmission 320 may be indicated by a unicast DCI 315 (e.g., in a DCI format 1_1, that includes a parameter "TCIpresentinDCI=enabled"). Thus, in cases where the scheduling threshold 330 is met (i.e., $k_0 \geq X$) the UE may determine the second beam 325 by the indication in the DCI 315.

In cases where the scheduling threshold 330 is not met (i.e., $k_0 < X$), such as illustrated in FIG. 3B, the indicated beam may not be applied. In this example, a first beam 355 may be used by a base station to transmit a downlink transmission 360 that may include control information such as DCI 365. The DCI 365 may include a set of allocated resources for a subsequent scheduled transmission 370. In this example, the scheduling threshold (X) 380 may be longer than the scheduling offset ($k_0$) 385 (i.e., $k_0 < X$), and the UE may not have sufficient time to change its receive beam to a receive beam indicted in the DCI 365. In such cases, a predefined beam 375 may be used for scheduled transmission 370. For example, the predefined beam 375 may be a beam of the lowest control resource set identification (CORESET ID) of a prior transmission slot. In some cases, the base station may determine that the DCI 365 is not transmitted ahead of the scheduling threshold X, and may use a downlink transmission beam that corresponds to the predefined beam 375.

In some cases, the control information from the base station may not include an explicit indication of the downlink transmit beam or receive beam to use at the UE. For example, if the parameter "TCIpresentinDCI" is not configured, or DCI 315 is for broadcasting PDCCH (e.g., DCI 315 has a DCI format 1_0), then the downlink transmission beam and associated receive beam at the UE may be determined based on one or more implicit indications provided by the first downlink transmission 310. Such an implicit indication may be that, if the DCI 315 is transmitted in sufficient time ahead of the start of the scheduled transmission 320, the scheduled transmission 320 uses the first beam 305. If the DCI 315 is not transmitted in sufficient time ahead of the scheduling threshold, the predefined beam 375 may be used. In some cases, the predefined beam 375 may correspond to a beam of the lowest CORESET ID in the last slot.

As discussed herein, in some cases, multiple repetitions of DCI 315 or DCI 365 may be transmitted, which each provide information related to a set of downlink resources for the scheduled transmission. The UE may blindly decode all candidate PDCCH search spaces without knowing the repetition. However, in cases where PDCCH transmissions lie on both sides of the scheduling threshold X, there may be ambiguity on which beam to use at the base station for transmitting the scheduled transmission. For example, if the UE were unable to decode a last PDCCH transmission that falls after the scheduling threshold 330 or 380, the UE may decode the first PDCCH transmission and follow the indication provided in the TCI for the first transmission. However, if the TCI in the first PDCCH does not indicate the predefined beam, there may be ambiguity, because if the UE had decoded the last PDCCH transmission the predefined beam 375 would have been used. Thus, the base station may have ambiguity since it does not know which PDCCH transmission was decoded at the UE. Accordingly, in such cases, techniques such as discussed herein, may provide scheduled transmissions that are transmitted using unambiguous downlink transmission beams.

Figure 4A:
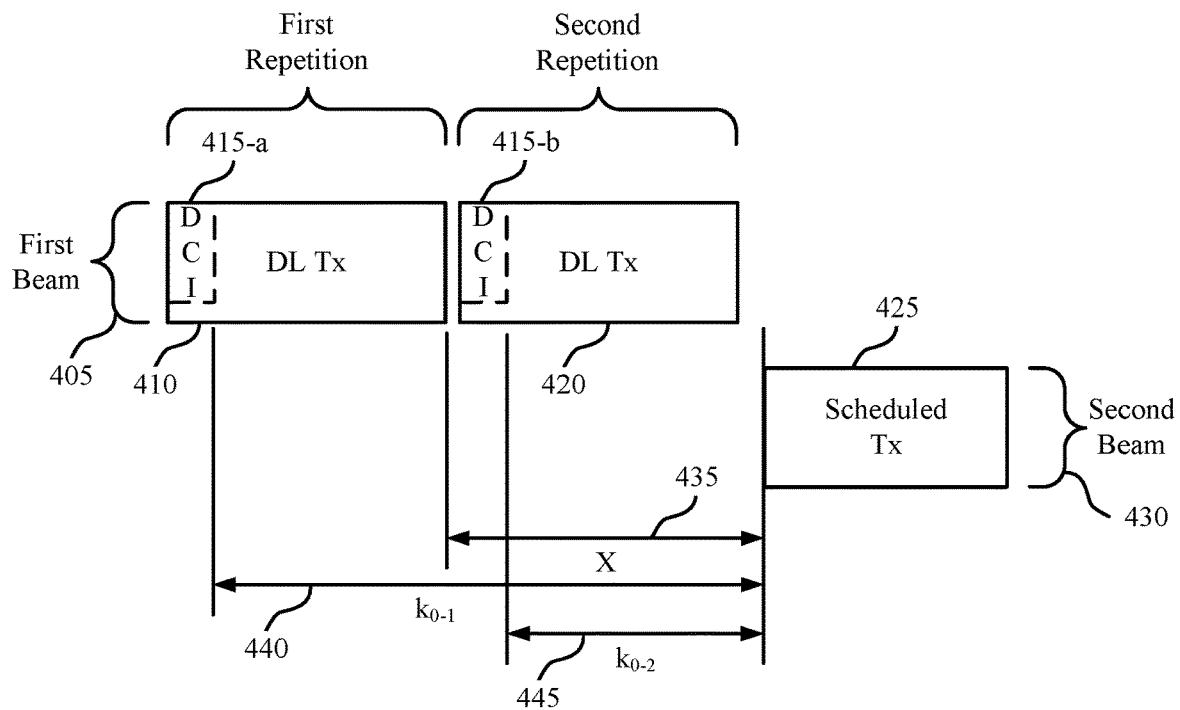
FIGS. 4A and 4B illustrate examples of control information repetition schemes and associated scheduled transmission beams that support beam determination techniques in beamformed wireless communications in accordance with aspects of the present disclosure.
Figure 4B:
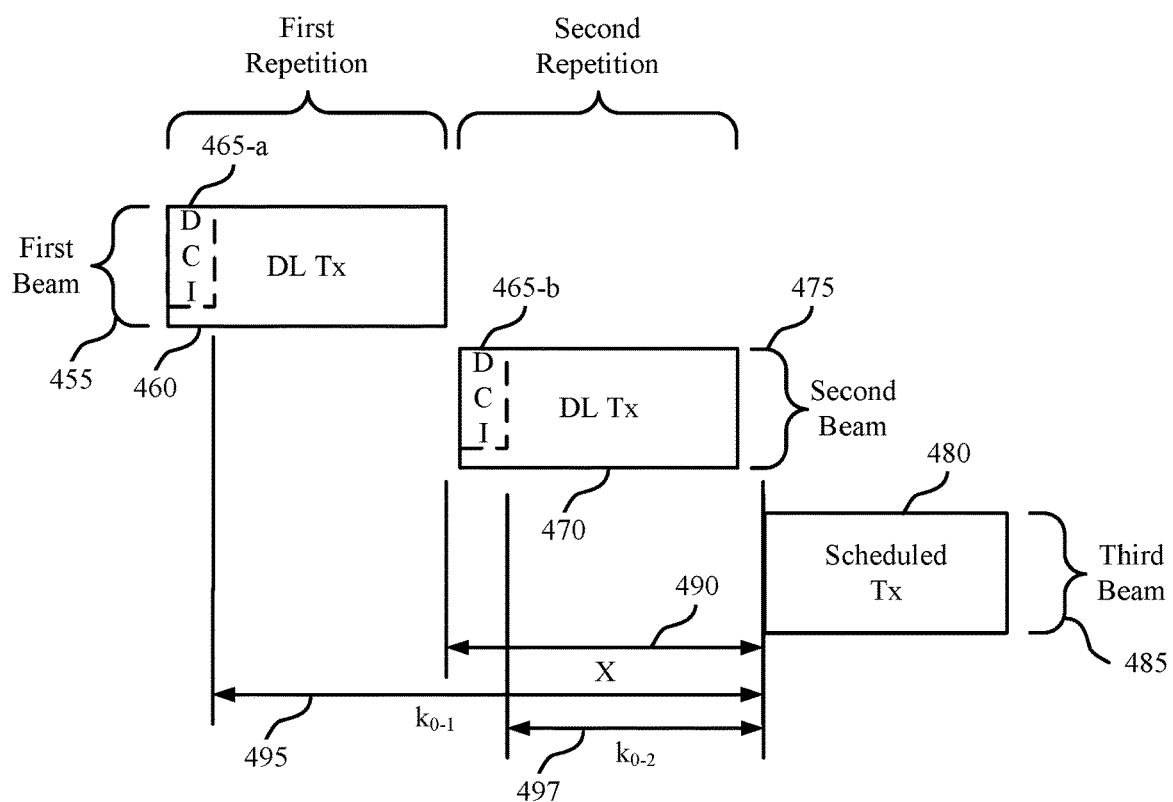

FIGS. 4A and 4B illustrate examples of control information repetition schemes and scheduled transmission beams 400 that support beam determination techniques in beamformed wireless communications in accordance with aspects of the present disclosure. In some examples, control information repetition schemes and scheduled transmission beams 400 and 450 may implement aspects of wireless communications system 100 or 200.

In the example of FIG. 4A, a first beam 405 may be used to transmit a first repetition of DCI 415-a in a first downlink transmission 410, and to transmit a second repetition of DCI 415-b in a second downlink transmission 420. In this case, the first repetition of DCI 415-a has a scheduling offset ($k_{0-1}$) 440 that provides the control information in advance of scheduling threshold (X) 435 and the second repetition of DCI 415-b has a scheduling offset ($k_{0-2}$) 445 that provides the control information after scheduling threshold (X) 435. Thus, if the UE were to decode the second repetition of DCI 415-b, the UE would use the predefined receive beam as the second beam 430 for the scheduled transmission 425. In cases where the DCI 415 includes an explicit TCI indication, the base station may indicate the predefined beam (e.g., the most recent configured lowest ID CORESET beam) in the first repetition of DCI 415-a, to avoid ambiguity. In cases where an explicit TCI indication is not provided, the first beam 405 may correspond to the predefined beam, in some examples.

While the example of FIG. 4A shows multiple repetitions of control information transmitted using a same first beam 405, other examples may provide repetitions of control information on different downlink transmission beams. Using different transmission beams may provide further reliability in a system, by providing transmit beam diversity for different repetitions, and in the event that one transmit beam is blocked, another transmit beam may not be blocked and may have a higher likelihood of having a successful communication of the control information. In the example of FIG. 4B, a first beam 455 may transmit a first repetition of DCI 465-a in a first downlink transmission 460, and a second beam 475 may transmit a second repetition of DCI 465-b in a second downlink transmission 470. The DCI 465 may indicate a set of resources for scheduled transmission 480 that uses a third beam 485.

Similarly, as with FIG. 4A, in this case, the first repetition of DCI 465-a has a scheduling offset ($k_{0-1}$) 495 that provides the control information in advance of scheduling threshold (X) 490 and the second repetition of DCI 465-b has a scheduling offset ($k_{0-2}$) 497 that provides the control information after scheduling threshold (X) 490. Thus, if the UE were to decode the second repetition of DCI 465-b, the UE would use the predefined receive beam as the third beam 485 for the scheduled transmission 480. In this case, again, if the DCI 465 includes an explicit TCI indication, the base station may indicate the predefined beam (e.g., the most recent configured lowest ID CORESET beam) as the third beam 485 in the first repetition of DCI 465-a, to avoid ambiguity.

In cases where an explicit TCI indication is not provided (e.g., for DCI format 1_0 or where "TCIpresentinDCI" is not configured), the first beam 455 may correspond to the predefined beam, and thus ambiguity in the receive beam used for the scheduled transmission 425 or 480 is avoided. In other cases where an explicit TCI indication is not provided, the base station may provide an indication to the UE that repetitions of control information have been enabled. For example, the base station may provide a one-bit indicator in an RRC establishment procedure, in RRC signaling, or with DCI that schedules the scheduled transmission, that indicates whether repetitions of control information are enabled or disabled. In cases where repetitions are enabled, a rule may be defined that is used to determine the beam for the scheduled transmission. For example, if repetitions are enabled, for the scheduled transmission the base station and UE may each use the lowest CORESET ID beam irrespective of the values of $k_0$ and X.

Figure 5:
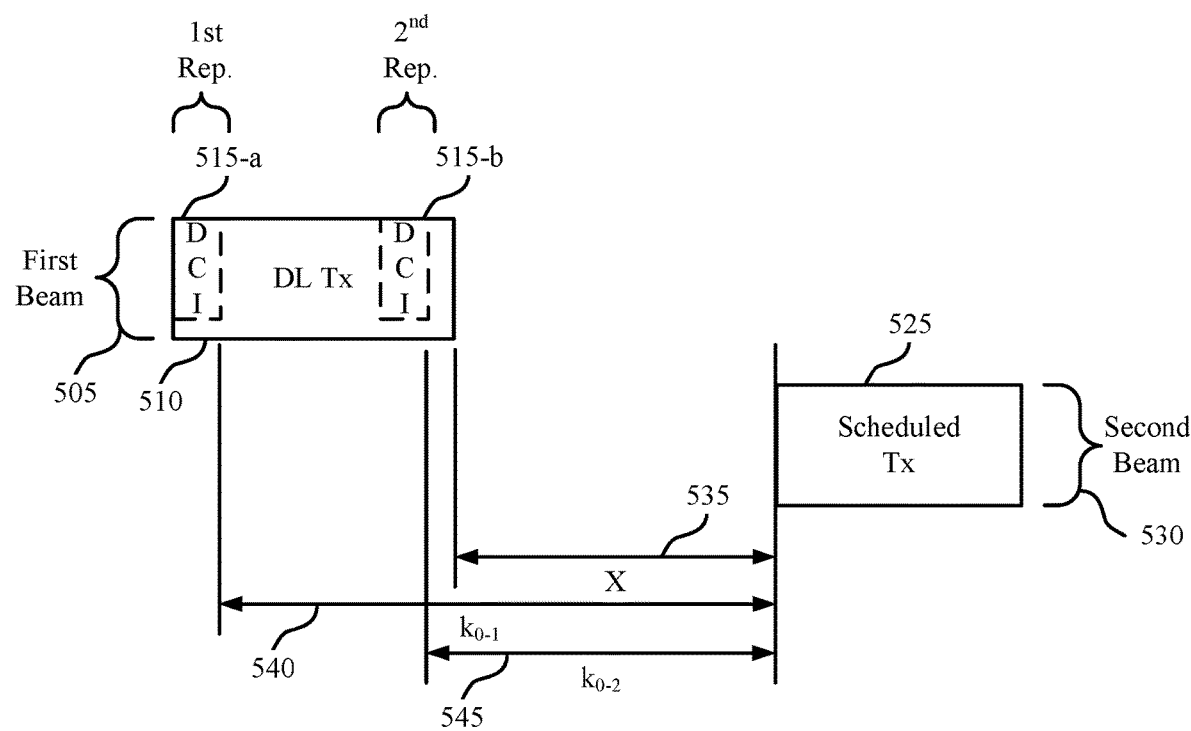
FIG. 5 illustrates another example of a control information repetition scheme and associated scheduled transmission beam that supports beam determination techniques in beamformed wireless communications in accordance with aspects of the present disclosure.

FIG. 5 illustrates an example of a control information repetition scheme and a scheduled transmission beam 500 that supports beam determination techniques in beamformed wireless communications in accordance with aspects of the present disclosure. In some examples, control information repetition scheme and a scheduled transmission beam 500 may implement aspects of wireless communications system 100 or 200.

In the example of FIG. 5, a first beam 505 may be used to transmit a first repetition of DCI 515-a and a second repetition of DCI 515-b in a first downlink transmission 510. In such examples, multiple PDCCHs may be transmitted within the same slot or within a distance (e.g., within a certain number of symbols). In some deployments, the scheduling threshold (X) 535 may have a granularity of one slot, and thus if the multiple repetitions of DCI 515 are in the same slot (or within the certain number of symbols, such as two symbols), then each repetition will be on the same side of the threshold. In this example, a first scheduling offset ($k_{0-1}$) 540 and a second scheduling offset ($k_{0-2}$) 545 are each greater than the scheduling threshold (X) 535. Accordingly, since each repetition of DCI 515 is on the same side of the threshold, there is no ambiguity on the indicated second beam 530 for the scheduled transmission 525.

Figure 6:
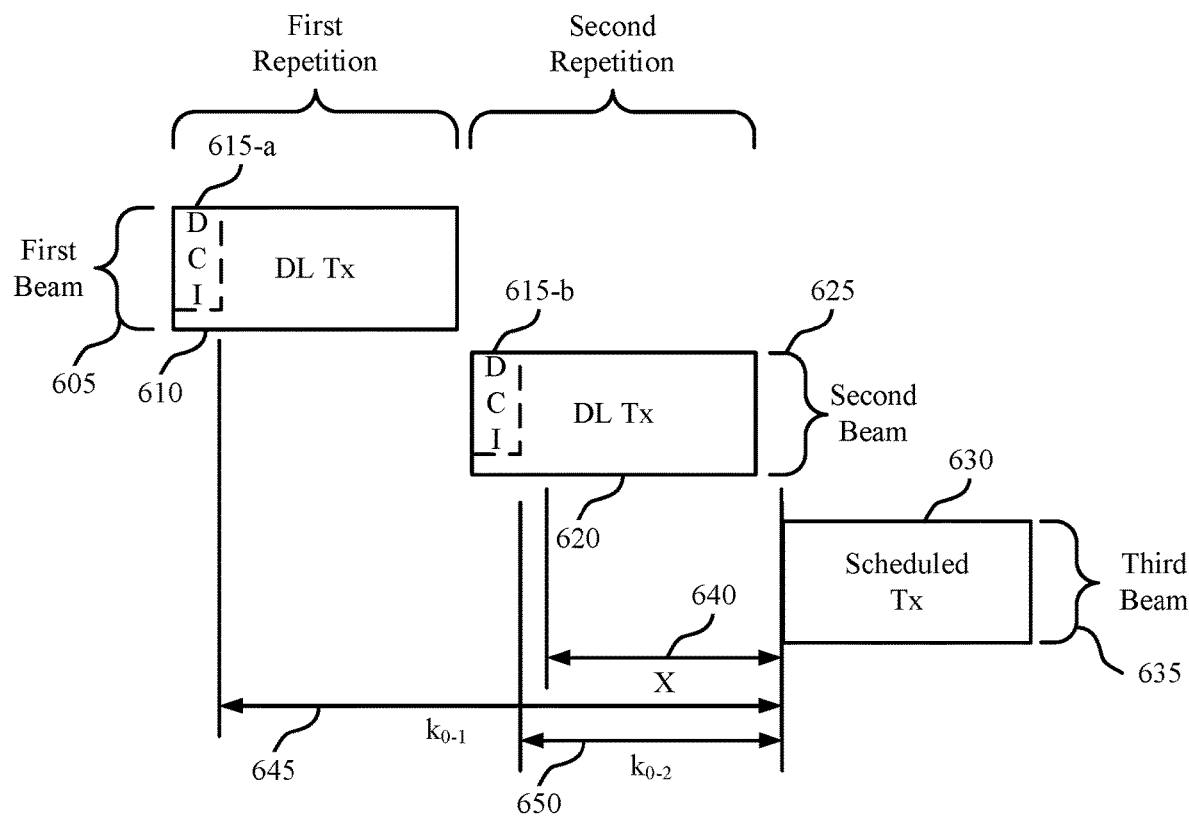
FIG. 6 illustrates another example of a control information repetition scheme and a scheduled transmission beam that supports beam determination techniques in beamformed wireless communications in accordance with aspects of the present disclosure.

FIG. 6 illustrates an example of a control information repetition scheme and a scheduled transmission beam 600 that supports beam determination techniques in beamformed wireless communications in accordance with aspects of the present disclosure. In some examples, control information repetition scheme and a scheduled transmission beam 600 may implement aspects of wireless communications system 100 or 200.

In the example of FIG. 6, a first beam 605 may be used to transmit a first repetition of DCI 615-a in a first downlink transmission 610 and a second beam 625 may be used to transmit a second repetition of DCI 615-b in a second downlink transmission 620. In this example, to avoid ambiguity in a third beam 635 to be used for the scheduled transmission 630, the multiple PDCCHs may each be transmitted in advance of scheduling threshold (X) 640. Thus, in this example, a first scheduling offset ($k_{0-1}$) 645 and a second scheduling offset ($k_{0-2}$) 650 are each greater than the scheduling threshold (X) 640. Accordingly, in such cases, the base station may be constrained to not schedule any DCI transmissions with scheduling information after the scheduling threshold 640, and thus the multiple repetitions of the control information, which may be in a same or different slot or on a same or different transmission beam, are all transmitted prior to the scheduling threshold and thus the predefined beam would not be used as a result of the control information being received at the UE without sufficient time to modify beamforming parameters for the scheduled transmission 630.

Figure 7:
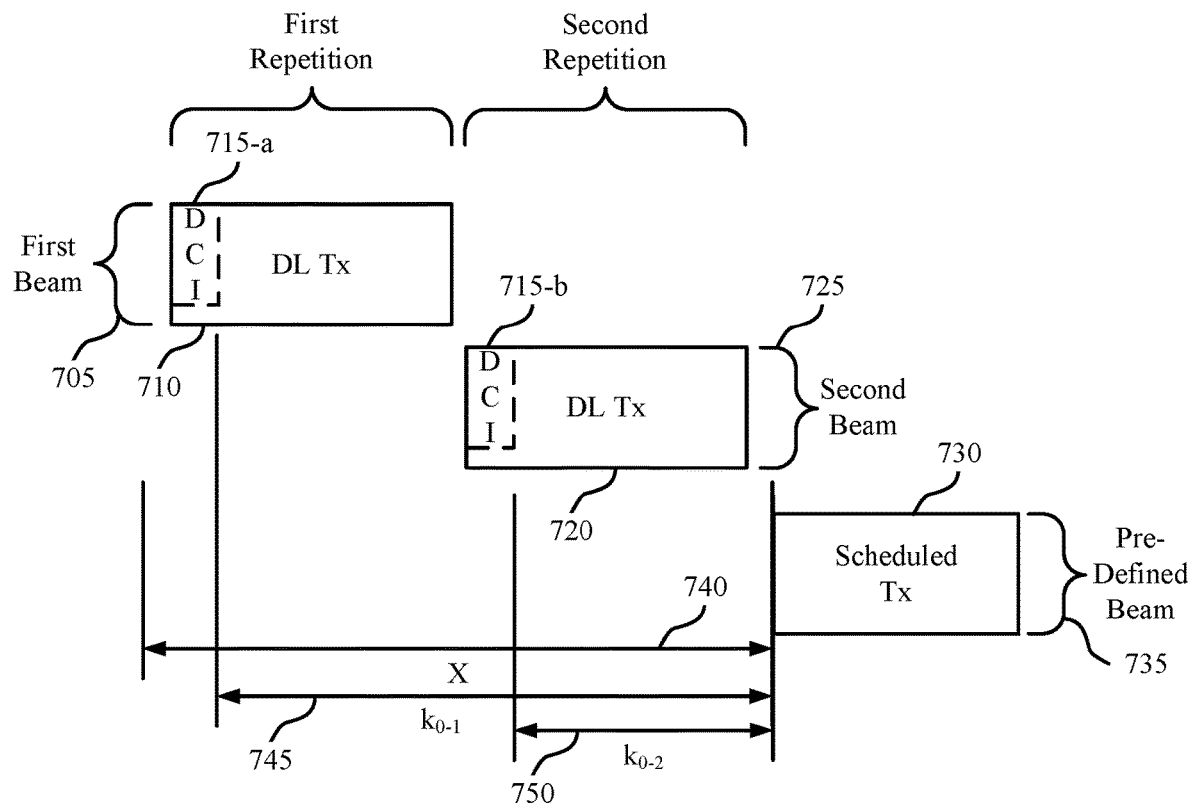
FIG. 7 illustrates another example of a control information repetition scheme and a scheduled transmission beam that supports beam determination techniques in beamformed wireless communications in accordance with aspects of the present disclosure.

FIG. 7 illustrates an example of a control information repetition scheme and a scheduled transmission beam 700 that supports beam determination techniques in beamformed wireless communications in accordance with aspects of the present disclosure. In some examples, a control information repetition scheme and a scheduled transmission beam 700 may implement aspects of wireless communications system 100 or 200.

In the example of FIG. 7, a first beam 705 may be used to transmit a first repetition of DCI 715-a in a first downlink transmission 710 and a second beam 725 may be used to transmit a second repetition of DCI 715-b in a second downlink transmission 720. In this example, to avoid ambiguity in a third beam 735 to be used for the scheduled transmission 730, the multiple PDCCHs may each be transmitted after the scheduling threshold (X) 740. Thus, in this example, a first scheduling offset ($k_{0-1}$) 745 and a second scheduling offset ($k_{0-2}$) 750 are each less than the scheduling threshold (X) 740. Accordingly, in such cases, the base station may be constrained to not schedule any DCI transmissions with scheduling information prior to the scheduling threshold 740, and thus the multiple repetitions of the control information, which may be in a same or different slot or on a same or different transmission beam, are all transmitted after the scheduling threshold and thus the predefined beam would be used regardless of which repetition is received at the UE.

Figure 8:
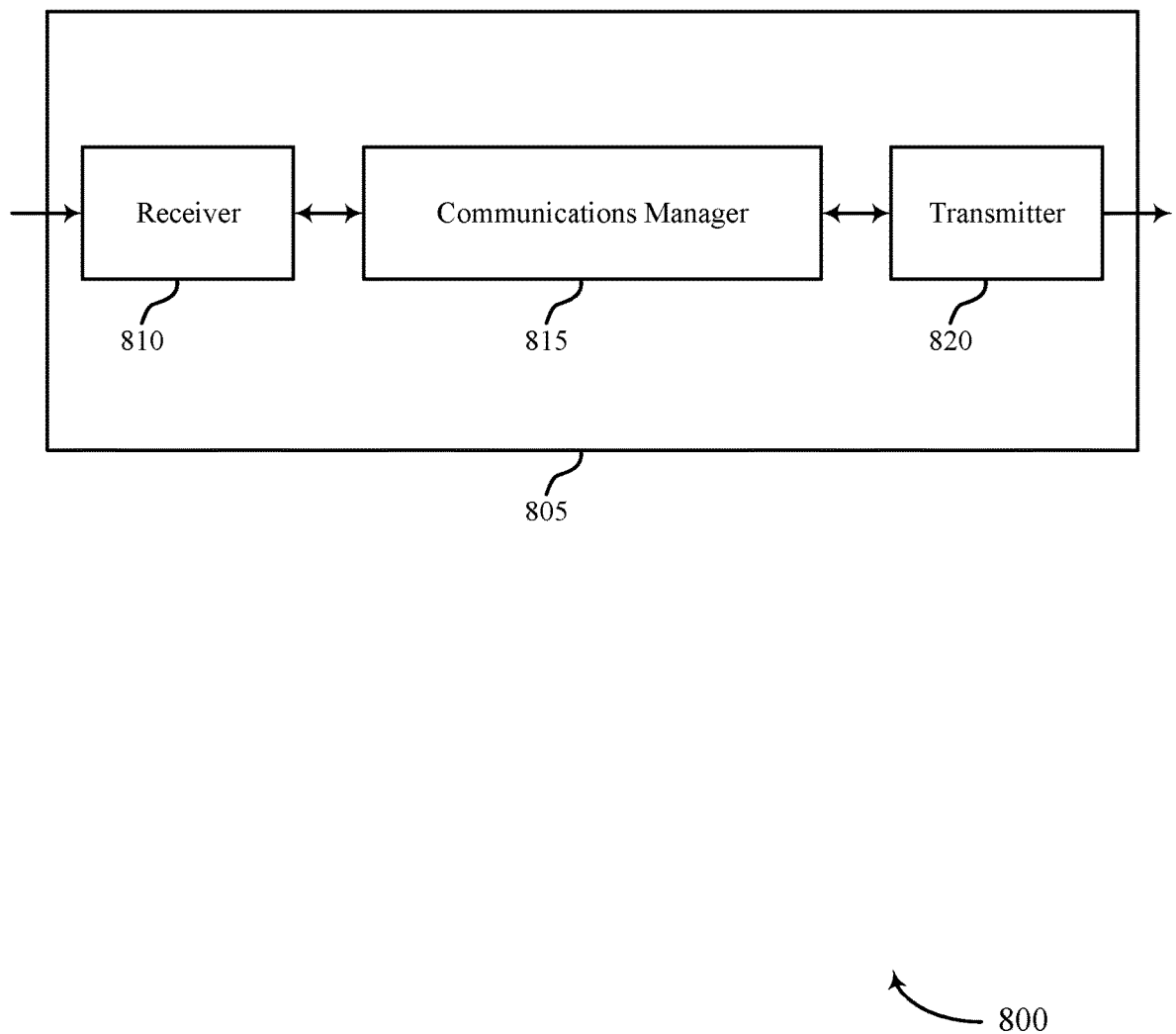
FIGS. 8 and 9 show block diagrams of devices that support beam determination techniques in beamformed wireless communications in accordance with aspects of the present disclosure.

FIG. 8 shows a block diagram 800 of a device 805 that supports beam determination techniques in beamformed wireless communications in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to beam determination techniques in beamformed wireless communications). Information may be passed on to other components of the device 805. The receiver 810 may be an example of aspects of the transceiver 1120 described with reference to FIG. 11. The receiver 810 may utilize a single antenna or a set of antennas.

The communications manager 815 may establish communications with a base station using a first pair of beamformed transmission beams, the first pair of beamformed transmission beams including a first downlink beam for transmissions from the base station to the UE and a first receive beam for receiving the first downlink beam at the UE, receive a repetition indication from the base station that indicates that control information from the base station is transmitted in a set of repetitions, where each repetition of the control information indicates a same set of resources for a scheduled transmission from the base station, and determine a second beam pair for the scheduled transmission based on the repetition indication. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
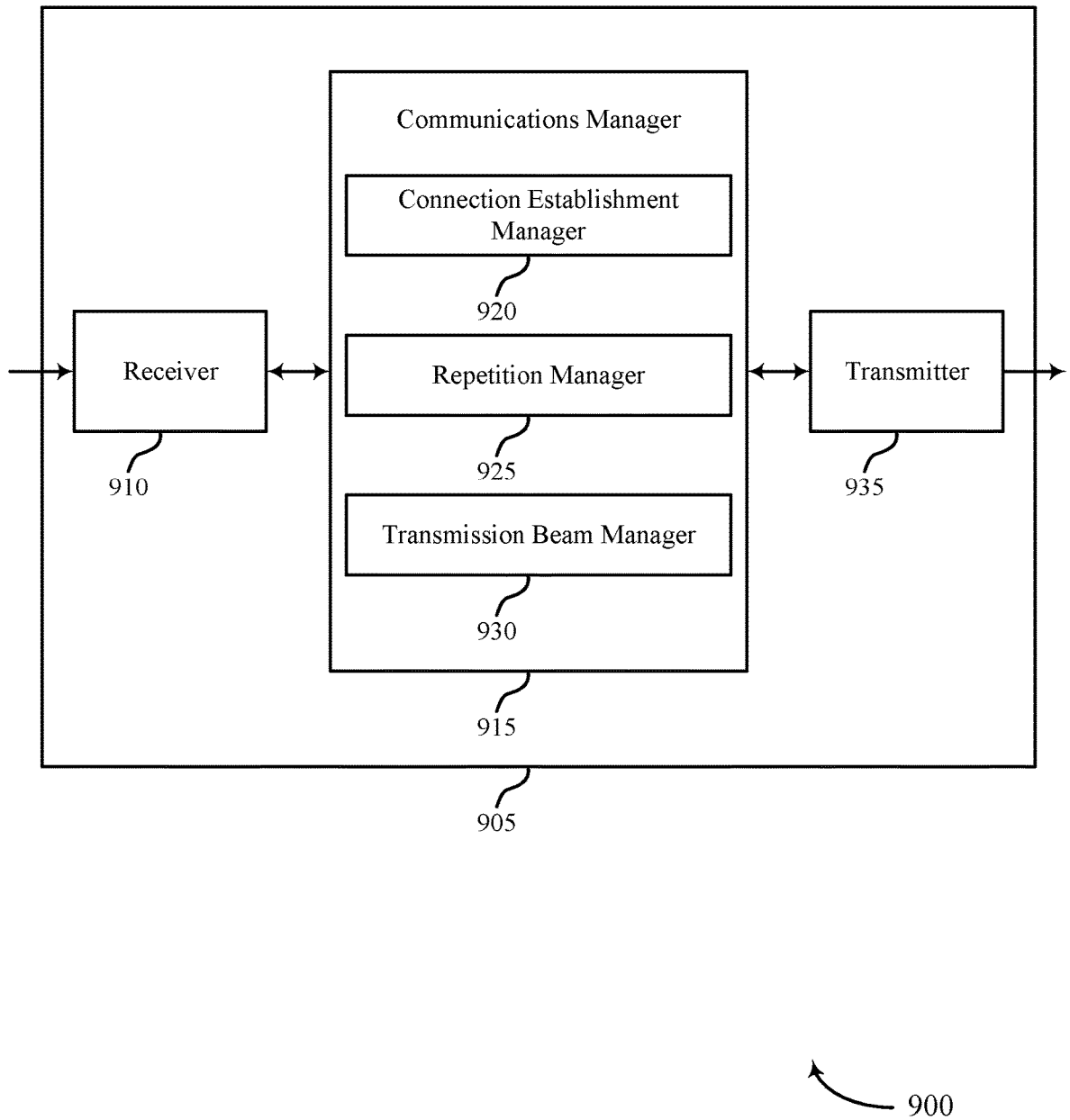

FIG. 9 shows a block diagram 900 of a device 905 that supports beam determination techniques in beamformed wireless communications in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to beam determination techniques in beamformed wireless communications). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a connection establishment manager 920, a repetition manager 925, and a transmission beam manager 930. The communications manager 915 may be an example of aspects of the communications manager 1110 described herein.

The connection establishment manager 920 may establish communications with a base station using a first pair of beamformed transmission beams, the first pair of beamformed transmission beams including a first downlink beam for transmissions from the base station to the UE and a first receive beam for receiving the first downlink beam at the UE.

The repetition manager 925 may receive a repetition indication from the base station that indicates that control information from the base station is transmitted in a set of repetitions, where each repetition of the control information indicates a same set of resources for a scheduled transmission from the base station.

The transmission beam manager 930 may determine a second beam pair for the scheduled transmission based on the repetition indication.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
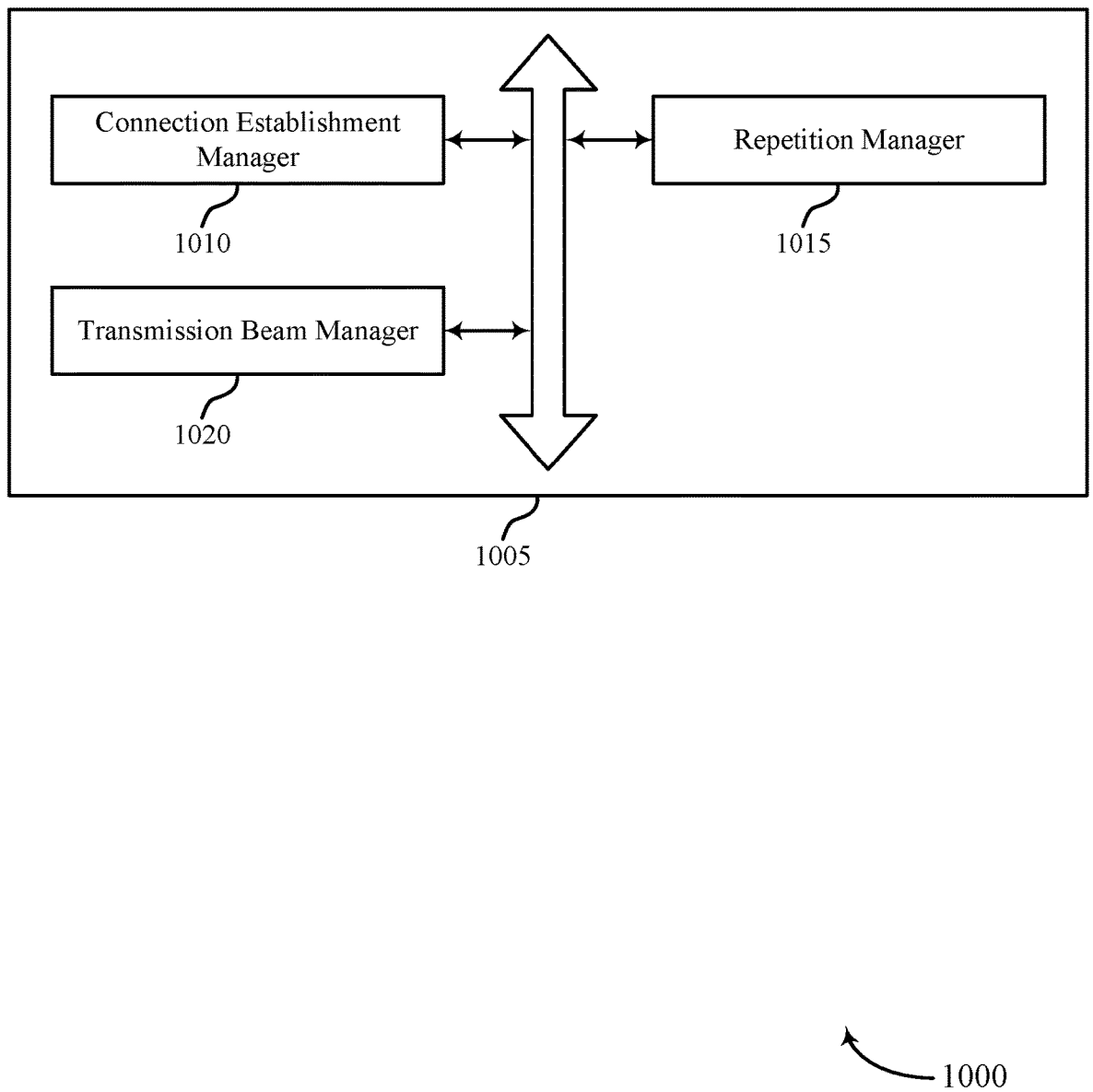
FIG. 10 shows a block diagram of a communications manager that supports beam determination techniques in beamformed wireless communications in accordance with aspects of the present disclosure.

FIG. 10 shows a block diagram 1000 of a communications manager 1005 that supports beam determination techniques in beamformed wireless communications in accordance with aspects of the present disclosure. The communications manager 1005 may be an example of aspects of a communications manager 815, a communications manager 915, or a communications manager 1110 described herein. The communications manager 1005 may include a connection establishment manager 1010, a repetition manager 1015, and a transmission beam manager 1020. Each of these modules may communicate, directly or indirectly, with one another (e.g., via one or more buses).

The connection establishment manager 1010 may establish communications with a base station using a first pair of beamformed transmission beams, the first pair of beamformed transmission beams including a first downlink beam for transmissions from the base station to the UE and a first receive beam for receiving the first downlink beam at the UE.

The repetition manager 1015 may receive a repetition indication from the base station that indicates that control information from the base station is transmitted in a set of repetitions, where each repetition of the control information indicates a same set of resources for a scheduled transmission from the base station.

The transmission beam manager 1020 may determine a second beam pair for the scheduled transmission based on the repetition indication. In some examples, the transmission beam manager 1020 may determine the second beam pair based on a lowest beam pair ID in a CORESET associated with a prior transmission slot. In some cases, the set of repetitions of the control information are transmitted using at least two different downlink beams. In some cases, the scheduled transmission includes one or more PDSCH transmissions, one or more AP-CSI-RS transmissions, or combinations thereof.

Figure 11:
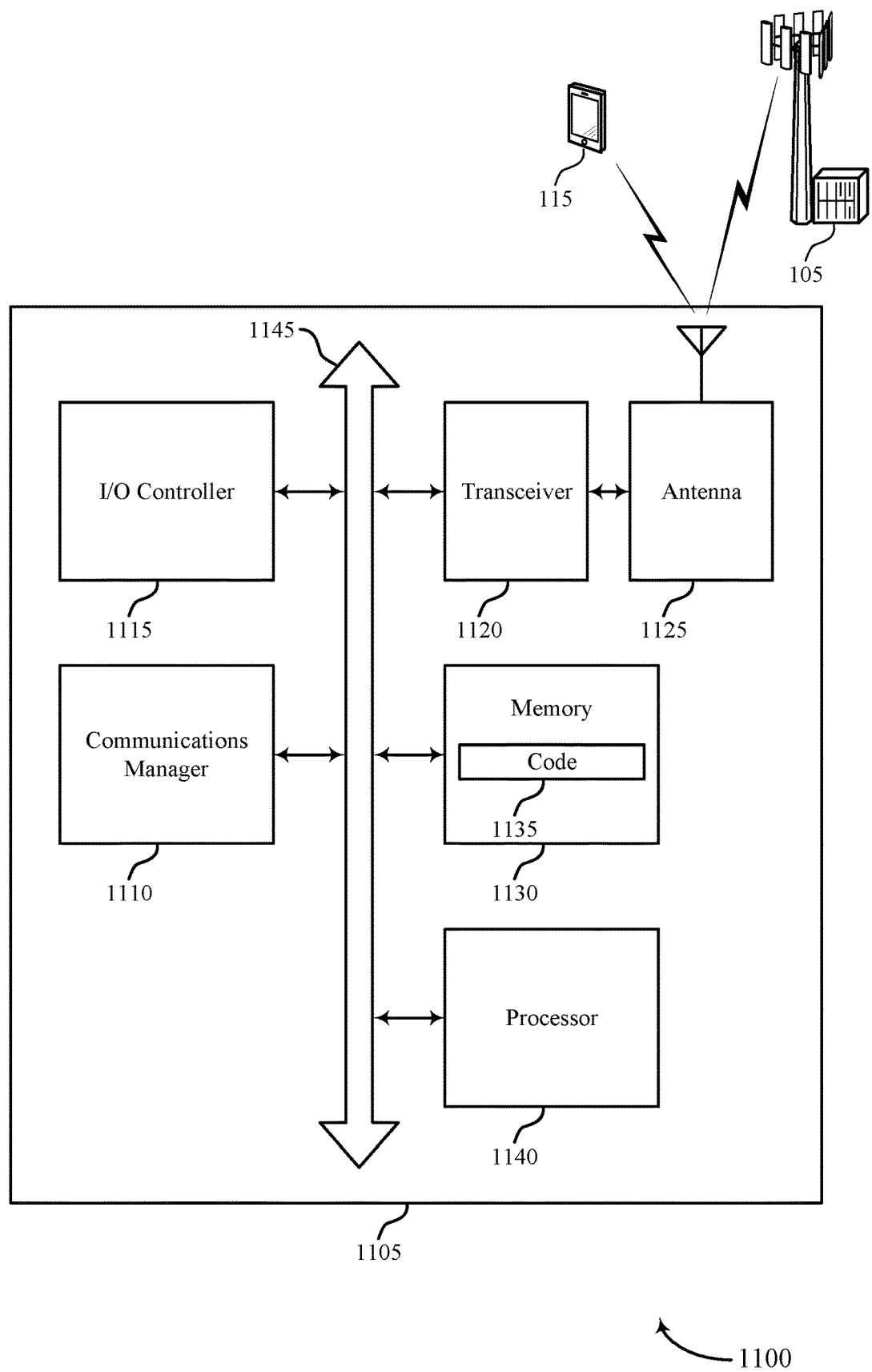
FIG. 11 shows a diagram of a system including a device that supports beam determination techniques in beamformed wireless communications in accordance with aspects of the present disclosure.

FIG. 11 shows a diagram of a system 1100 including a device 1105 that supports beam determination techniques in beamformed wireless communications in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may establish communications with a base station using a first pair of beamformed transmission beams, the first pair of beamformed transmission beams including a first downlink beam for transmissions from the base station to the UE and a first receive beam for receiving the first downlink beam at the UE, receive a repetition indication from the base station that indicates that control information from the base station is transmitted in a set of repetitions, where each repetition of the control information indicates a same set of resources for a scheduled transmission from the base station, and determine a second beam pair for the scheduled transmission based on the repetition indication.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases, the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/basic output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting beam determination techniques in beamformed wireless communications).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
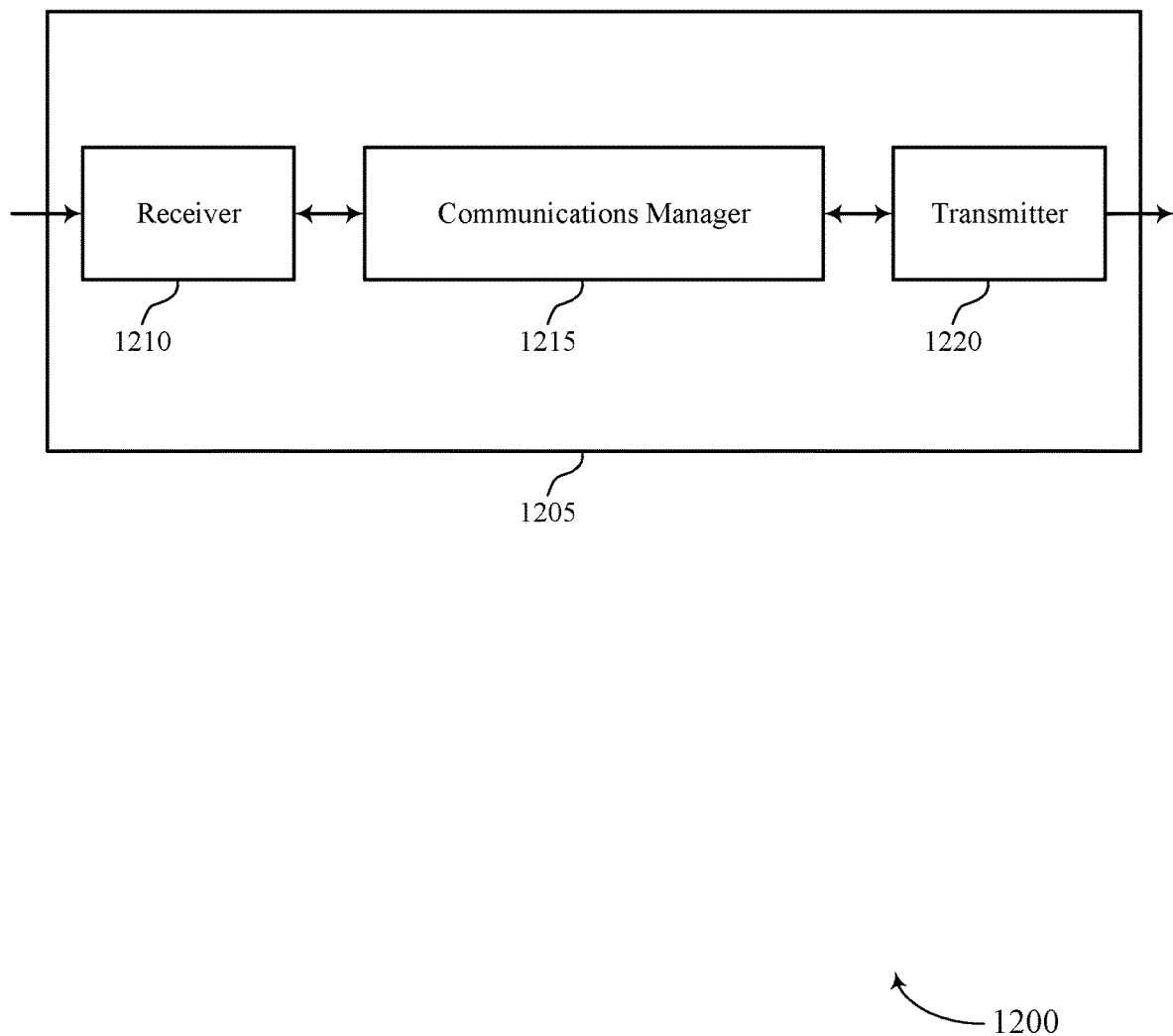
FIGS. 12 and 13 show block diagrams of devices that support beam determination techniques in beamformed wireless communications in accordance with aspects of the present disclosure.

FIG. 12 shows a block diagram 1200 of a device 1205 that supports beam determination techniques in beamformed wireless communications in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to beam determination techniques in beamformed wireless communications). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may establish communications with a UE using a first pair of beamformed transmission beams. In some cases, the first pair of beamformed transmission beams include a first downlink beam for transmissions from the base station to the UE and a first receive beam for receiving the first downlink beam at the UE. The communications manager 1215 may transmit a set of repetitions of control information to the UE that each include a same set of resources and provide an indication of a second beam pair for a scheduled transmission with the UE. In some cases, the communications manager 1215 may determine a scheduling threshold for the UE that corresponds to a time in advance of a start time of the set of resources for the UE to change from the first receive beam to a second receive beam for the scheduled transmission, and identify a predetermined beam pair that is used for the scheduled transmission based on control information transmitted to the UE after the scheduling threshold. In some cases, the communications manager 1215 may set the indication of the second beam pair based on whether one or more of the set of repetitions is transmitted after the scheduling threshold.

The communications manager 1215 may also determine a scheduling threshold for a UE that corresponds to a time in advance of a start time of a transmission to the UE for the UE to change from a first receive beam to a second receive beam for receiving the transmission. The first receive beam may be associated with a first beam pair that includes a first downlink beam and the first receive beam, and the second receive beam may be associated with a second beam pair that includes a second downlink beam and the second receive beam. In some cases, each of the set of repetitions are transmitted in advance of the scheduling threshold, and the scheduled transmission with the UE may be via the second beam pair. In some cases, the UE may use a predefined beam pair responsive to control information transmitted to the UE after the scheduling threshold and the repetitions of control information are transmitted after the scheduling threshold, and the UE and base station may communicate the scheduled transmission via the predefined beam pair.

The communications manager 1215 may be an example of aspects of the communications manager 1510 described herein. The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
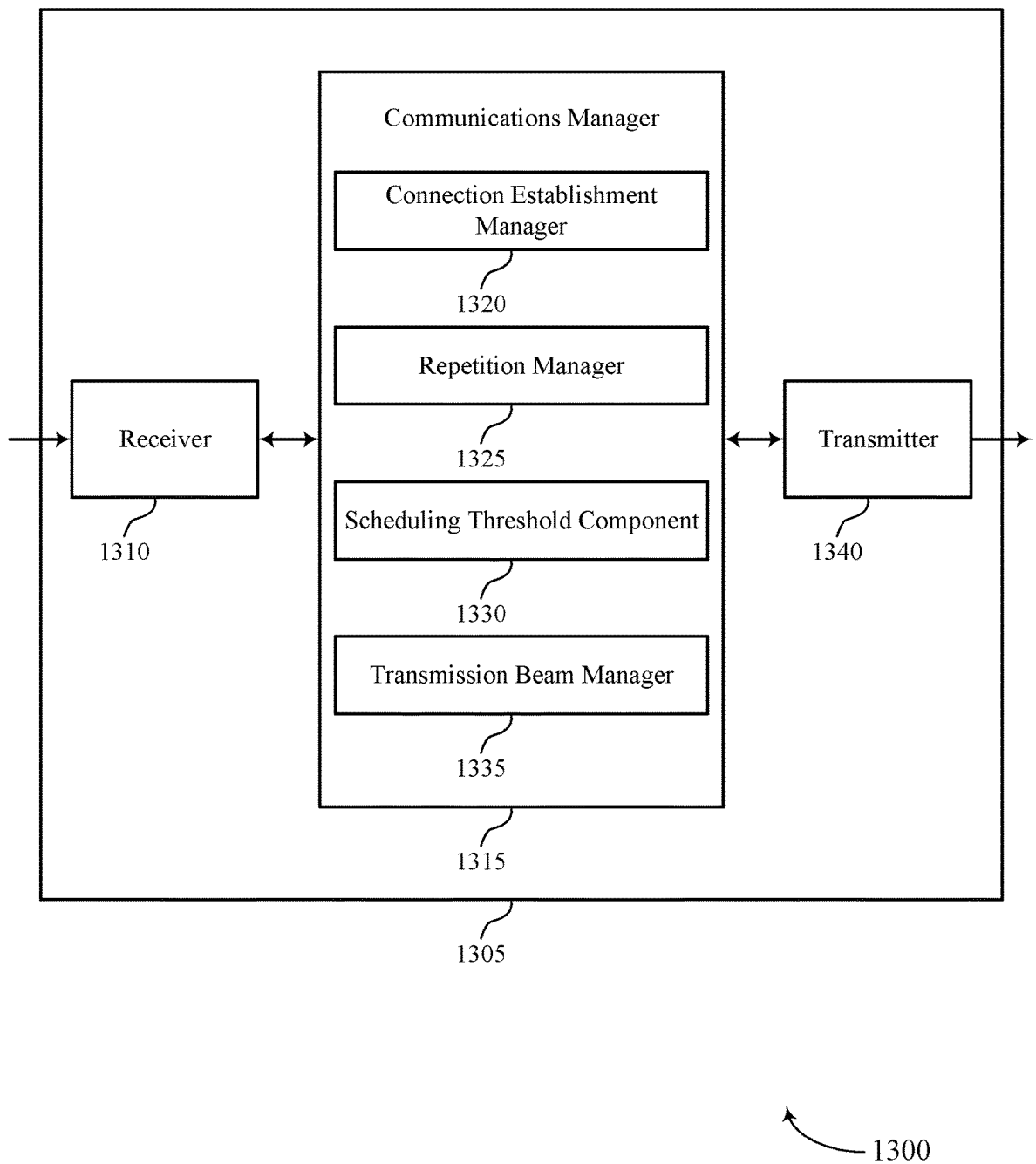

FIG. 13 shows a block diagram 1300 of a device 1305 that supports beam determination techniques in beamformed wireless communications in accordance with aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to beam determination techniques in beamformed wireless communications). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a connection establishment manager 1320, a repetition manager 1325, a scheduling threshold component 1330, and a transmission beam manager 1335. The communications manager 1315 may be an example of aspects of the communications manager 1510 described herein.

The connection establishment manager 1320 may establish communications with a UE using a first pair of beamformed transmission beams, the first pair of beamformed transmission beams including a first downlink beam for transmissions from the base station to the UE and a first receive beam for receiving the first downlink beam at the UE.

The repetition manager 1325 may transmit a set of repetitions of control information to the UE that each include a same set of resources and provide an indication of a second beam pair for a scheduled transmission with the UE. In some cases, one or more of the repetitions may be transmitted in advance of the scheduling threshold, and one or more of the repetitions may be transmitted after the scheduling threshold. In some cases, each of the set of repetitions are transmitted in advance of the scheduling threshold. In other cases, the set of repetitions of control information are transmitted after the scheduling threshold.

The scheduling threshold component 1330 may determine the scheduling threshold for the UE that corresponds to a time in advance of a start time of the set of resources for the UE to change from the first receive beam to a second receive beam for the scheduled transmission. The first receive beam may be associated with a first beam pair that includes a first downlink beam and the first receive beam, and the second receive beam may be associated with a second beam pair that includes a second downlink beam and the second receive beam. In some cases, the UE uses a predefined beam pair responsive to control information transmitted to the UE after the scheduling threshold.

The transmission beam manager 1335 may identify a predetermined beam pair that is used for the scheduled transmission based on control information transmitted to the UE after the scheduling threshold and set the indication of the second beam pair based on whether one or more of the set of repetitions is transmitted after the scheduling threshold. In some cases, the transmission beam manager 1335 may communicate the scheduled transmission with the UE via the second beam pair, or via the predefined beam pair, depending on whether one or more repetitions are transmitted after the scheduling threshold.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
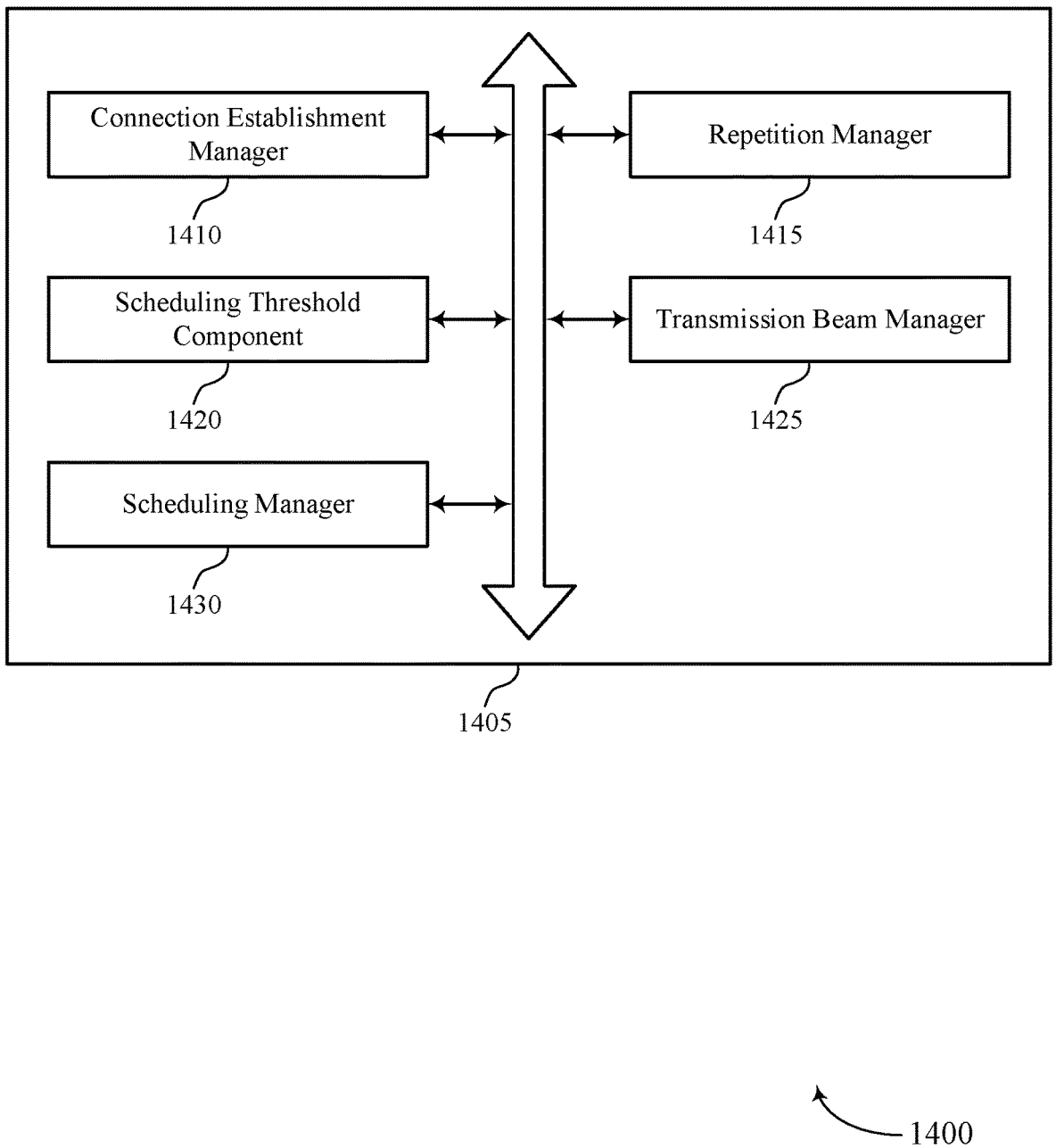
FIG. 14 shows a block diagram of a communications manager that supports beam determination techniques in beamformed wireless communications in accordance with aspects of the present disclosure.

FIG. 14 shows a block diagram 1400 of a communications manager 1405 that supports beam determination techniques in beamformed wireless communications in accordance with aspects of the present disclosure. The communications manager 1405 may be an example of aspects of a communications manager 1215, a communications manager 1315, or a communications manager 1510 described herein. The communications manager 1405 may include a connection establishment manager 1410, a repetition manager 1415, a scheduling threshold component 1420, a transmission beam manager 1425, and a scheduling manager 1430. Each of these modules may communicate, directly or indirectly, with one another (e.g., via one or more buses).

The connection establishment manager 1410 may establish communications with a UE using a first pair of beamformed transmission beams, the first pair of beamformed transmission beams including a first downlink beam for transmissions from the base station to the UE and a first receive beam for receiving the first downlink beam at the UE.

The repetition manager 1415 may transmit a set of repetitions of control information to the UE that each include a same set of resources and provide an indication of a second beam pair for a scheduled transmission with the UE. In some examples, the repetition manager 1415 may transmit a repetition indicator that signals the set of repetitions are transmitted, and where the second beam pair is identified based on the repetition indicator. In some examples, two or more of the set of repetitions of control information are transmitted in different transmission slots and each provide the indication of the second beam pair. In some cases, the set of repetitions of control information are transmitted using at least two different downlink beams. In some cases, the second beam pair is identified based on the repetition indicator irrespective of which of at least two different downlink beams provides the control information. In some cases, the repetition indicator is included in RRC signaling, or with the control information in each of the set of repetitions. In some cases, the second beam pair corresponds to a lowest beam pair ID in a CORESET associated with a prior transmission slot. In some cases, the indication for the second beam pair is based on a downlink beam that provides the control information, where the second beam pair corresponds to a beam pair that corresponds to or is QCL with the downlink beam that provides the control information. In some cases, each of the set of repetitions of control information are transmitted within a same transmission slot. In some cases, the set of repetitions of control information are transmitted using at least two different downlink beams, and where the indication for the second beam pair is an explicit indication of the second beam pair.

The scheduling threshold component 1420 may determine a scheduling threshold for the UE that corresponds to a time in advance of a start time of the set of resources for the UE to change from the first receive beam to a second receive beam for the scheduled transmission. In some cases, the first receive beam may be associated with a first beam pair that includes a first downlink beam and the first receive beam, and the second receive beam may be associated with a second beam pair that includes a second downlink beam and the second receive beam. In some cases, the UE uses a predefined beam pair responsive to control information transmitted to the UE after the scheduling threshold.

The transmission beam manager 1425 may identify a predetermined beam pair that is used for the scheduled transmission based on control information transmitted to the UE after the scheduling threshold. In some examples, the transmission beam manager 1425 may set the indication of the second beam pair based on whether one or more of the set of repetitions is transmitted after the scheduling threshold. In some examples, the transmission beam manager 1425 may communicate the scheduled transmission with the UE via the second beam pair. In some examples, the transmission beam manager 1425 may communicate the scheduled transmission with the UE via the predefined beam pair. In some examples, the transmission beam manager 1425 may set the indication of the second beam pair to be the predetermined beam pair.

In some examples, the transmission beam manager 1425 may transmit a first repetition of the set of repetitions in advance of the scheduling threshold using a second downlink beam that corresponds to the predetermined beam pair. In some examples, ambiguity associated with two or more different downlink beams used to transmit the set of repetitions is removed based on each of the set of repetitions being transmitted after the scheduling threshold. In some cases, the scheduled transmission includes one or more PDSCH transmissions, one or more AP-CSI-RS transmissions, or combinations thereof.

In some cases, the UE selects the second receive beam based on the second downlink beam being used to transmit the control information when the control information is transmitted prior to the scheduling threshold. In some cases, the set of repetitions of control information are transmitted using at least two different downlink beams. The scheduling manager 1430 may schedule at least one of the set of repetitions to be transmitted after the scheduling threshold.

Figure 15:
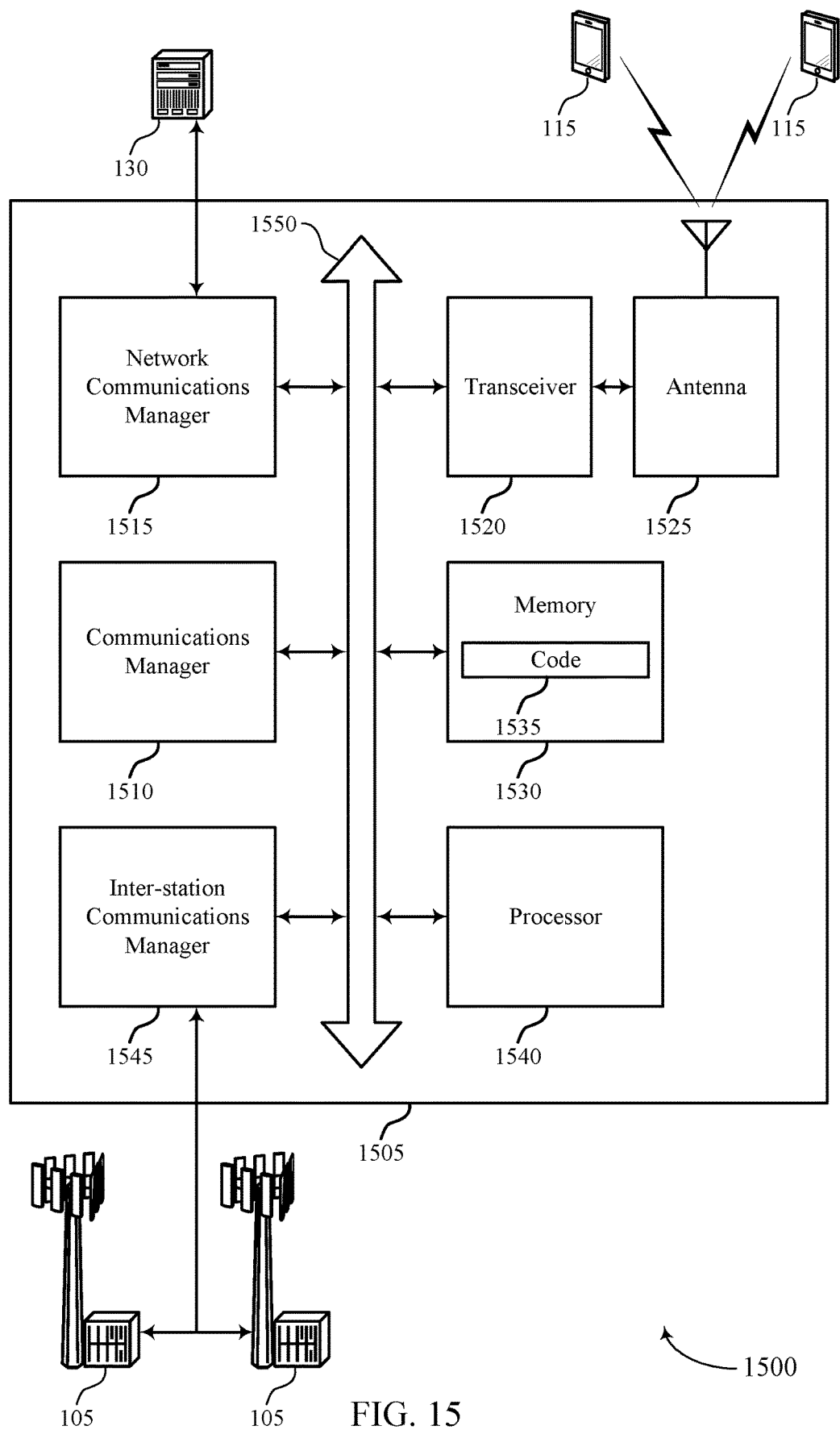
FIG. 15 shows a diagram of a system including a device that supports beam determination techniques in beamformed wireless communications in accordance with aspects of the present disclosure.

FIG. 15 shows a diagram of a system 1500 including a device 1505 that supports beam determination techniques in beamformed wireless communications in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may establish communications with a UE using a first pair of beamformed transmission beams, the first pair of beamformed transmission beams including a first downlink beam for transmissions from the base station to the UE and a first receive beam for receiving the first downlink beam at the UE. In some cases, communications manager 1510 may transmit a set of repetitions of control information to the UE that each include a same set of resources and provide an indication of a second beam pair for a scheduled transmission with the UE. In some cases, communications manager 1510 may determine a scheduling threshold for the UE that corresponds to a time in advance of a start time of the set of resources for the UE to change from the first receive beam to a second receive beam for the scheduled transmission, identify a predetermined beam pair that is used for the scheduled transmission based on control information transmitted to the UE after the scheduling threshold, and set the indication of the second beam pair based on whether one or more of the set of repetitions is transmitted after the scheduling threshold.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases, the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting beam determination techniques in beamformed wireless communications).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
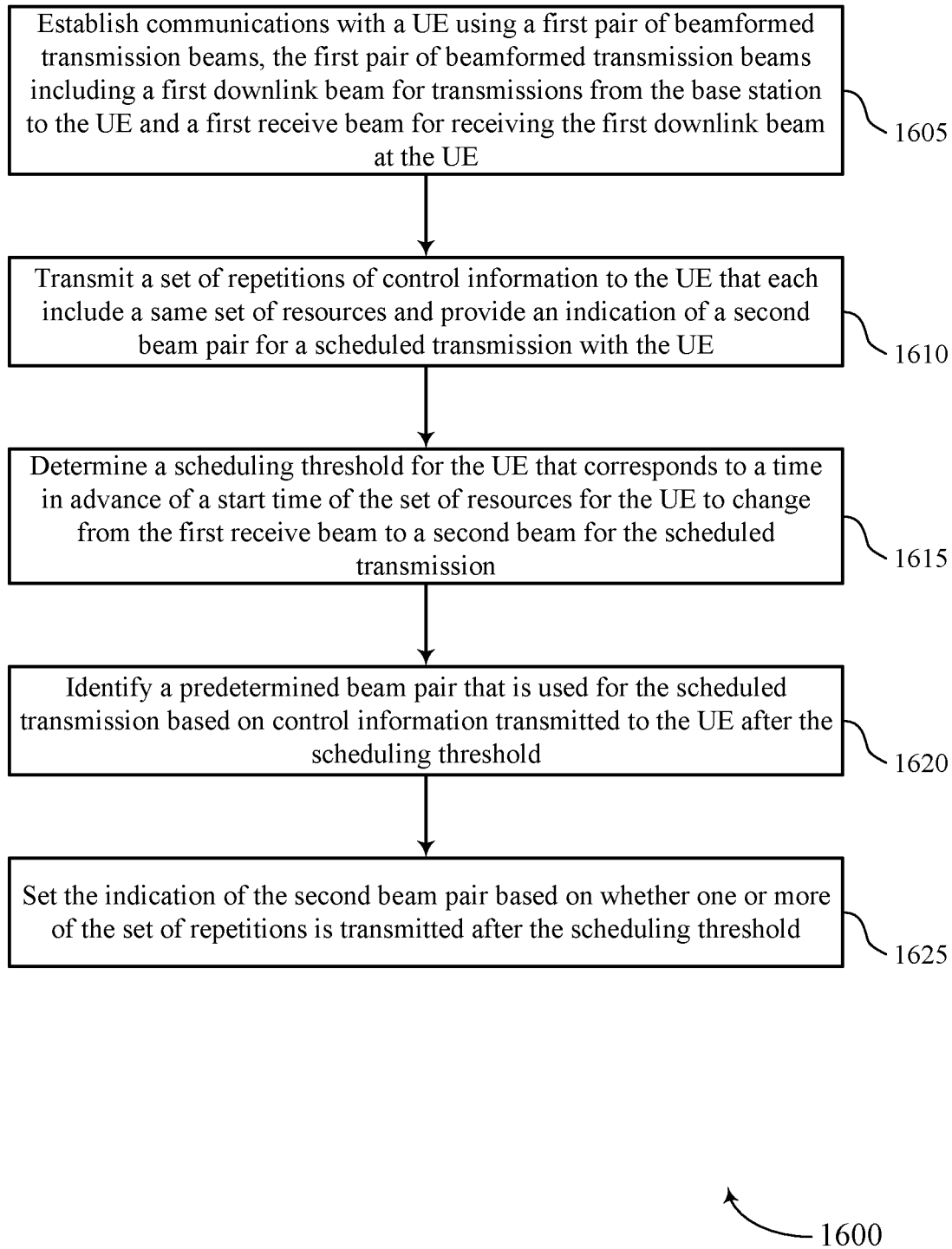
FIGS. 16 through 23 show flowcharts illustrating methods that support beam determination techniques in beamformed wireless communications in accordance with aspects of the present disclosure.

FIG. 16 shows a flowchart illustrating a method 1600 that supports beam determination techniques in beamformed wireless communications in accordance with aspects of the present disclosure. The operations of method 1600 may be implemented by a base station 105 or its components as described herein. For example, the operations of method 1600 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1605, the base station may establish communications with a UE using a first pair of beamformed transmission beams, the first pair of beamformed transmission beams including a first downlink beam for transmissions from the base station to the UE and a first receive beam for receiving the first downlink beam at the UE. The operations of 1605 may be performed according to the methods described herein. In some examples, aspects of the operations of 1605 may be performed by a connection establishment manager as described with reference to FIGS. 12 through 15.

At 1610, the base station may transmit a set of repetitions of control information to the UE that each include a same set of resources and provide an indication of a second beam pair for a scheduled transmission with the UE. The operations of 1610 may be performed according to the methods described herein. In some examples, aspects of the operations of 1610 may be performed by a repetition manager as described with reference to FIGS. 12 through 15.

At 1615, the base station may determine a scheduling threshold for the UE that corresponds to a time in advance of a start time of the set of resources for the UE to change from the first receive beam to a second beam for the scheduled transmission. The operations of 1615 may be performed according to the methods described herein. In some examples, aspects of the operations of 1615 may be performed by a scheduling threshold component as described with reference to FIGS. 12 through 15.

At 1620, the base station may identify a predetermined beam pair that is used for the scheduled transmission based on control information transmitted to the UE after the scheduling threshold. The operations of 1620 may be performed according to the methods described herein. In some examples, aspects of the operations of 1620 may be performed by a transmission beam manager as described with reference to FIGS. 12 through 15.

At 1625, the base station may set the indication of the second beam pair based on whether one or more of the set of repetitions is transmitted after the scheduling threshold. The operations of 1625 may be performed according to the methods described herein. In some examples, aspects of the operations of 1625 may be performed by a transmission beam manager as described with reference to FIGS. 12 through 15.

Figure 17:
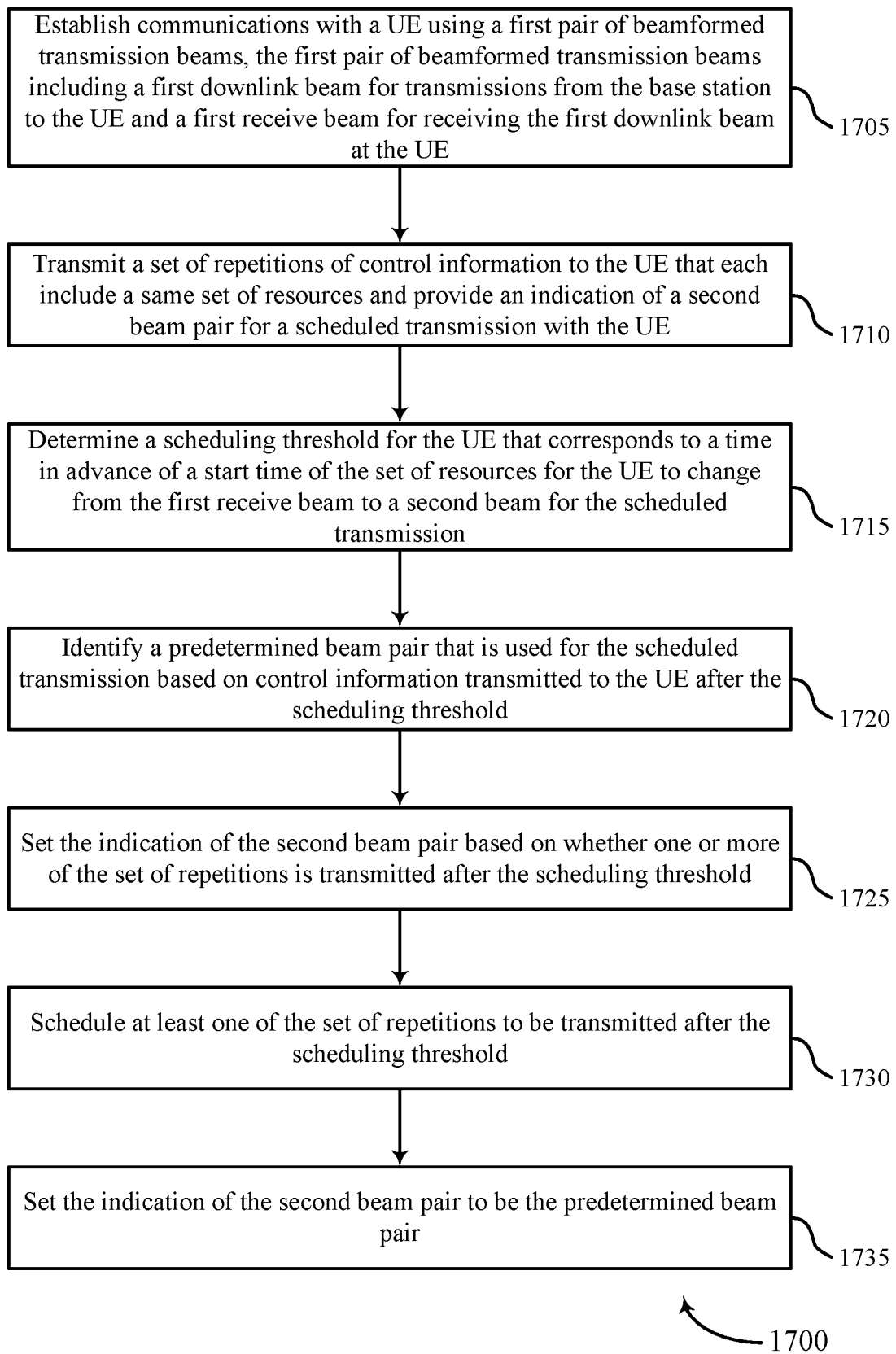

FIG. 17 shows a flowchart illustrating a method 1700 that supports beam determination techniques in beamformed wireless communications in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1705, the base station may establish communications with a UE using a first pair of beamformed transmission beams, the first pair of beamformed transmission beams including a first downlink beam for transmissions from the base station to the UE and a first receive beam for receiving the first downlink beam at the UE. The operations of 1705 may be performed according to the methods described herein. In some examples, aspects of the operations of 1705 may be performed by a connection establishment manager as described with reference to FIGS. 12 through 15.

At 1710, the base station may transmit a set of repetitions of control information to the UE that each include a same set of resources and provide an indication of a second beam pair for a scheduled transmission with the UE. The operations of 1710 may be performed according to the methods described herein. In some examples, aspects of the operations of 1710 may be performed by a repetition manager as described with reference to FIGS. 12 through 15.

At 1715, the base station may determine a scheduling threshold for the UE that corresponds to a time in advance of a start time of the set of resources for the UE to change from the first receive beam to a second beam for the scheduled transmission. The operations of 1715 may be performed according to the methods described herein. In some examples, aspects of the operations of 1715 may be performed by a scheduling threshold component as described with reference to FIGS. 12 through 15.

At 1720, the base station may identify a predetermined beam pair that is used for the scheduled transmission based on control information transmitted to the UE after the scheduling threshold. The operations of 1720 may be performed according to the methods described herein. In some examples, aspects of the operations of 1720 may be performed by a transmission beam manager as described with reference to FIGS. 12 through 15.

At 1725, the base station may set the indication of the second beam pair based on whether one or more of the set of repetitions is transmitted after the scheduling threshold. The operations of 1725 may be performed according to the methods described herein. In some examples, aspects of the operations of 1725 may be performed by a transmission beam manager as described with reference to FIGS. 12 through 15.

At 1730, the base station may schedule at least one of the set of repetitions to be transmitted after the scheduling threshold. The operations of 1730 may be performed according to the methods described herein. In some examples, aspects of the operations of 1730 may be performed by a scheduling manager as described with reference to FIGS. 12 through 15.

At 1735, the base station may set the indication of the second beam pair to be the predetermined beam pair. The operations of 1735 may be performed according to the methods described herein. In some examples, aspects of the operations of 1735 may be performed by a transmission beam manager as described with reference to FIGS. 12 through 15.

Figure 18:
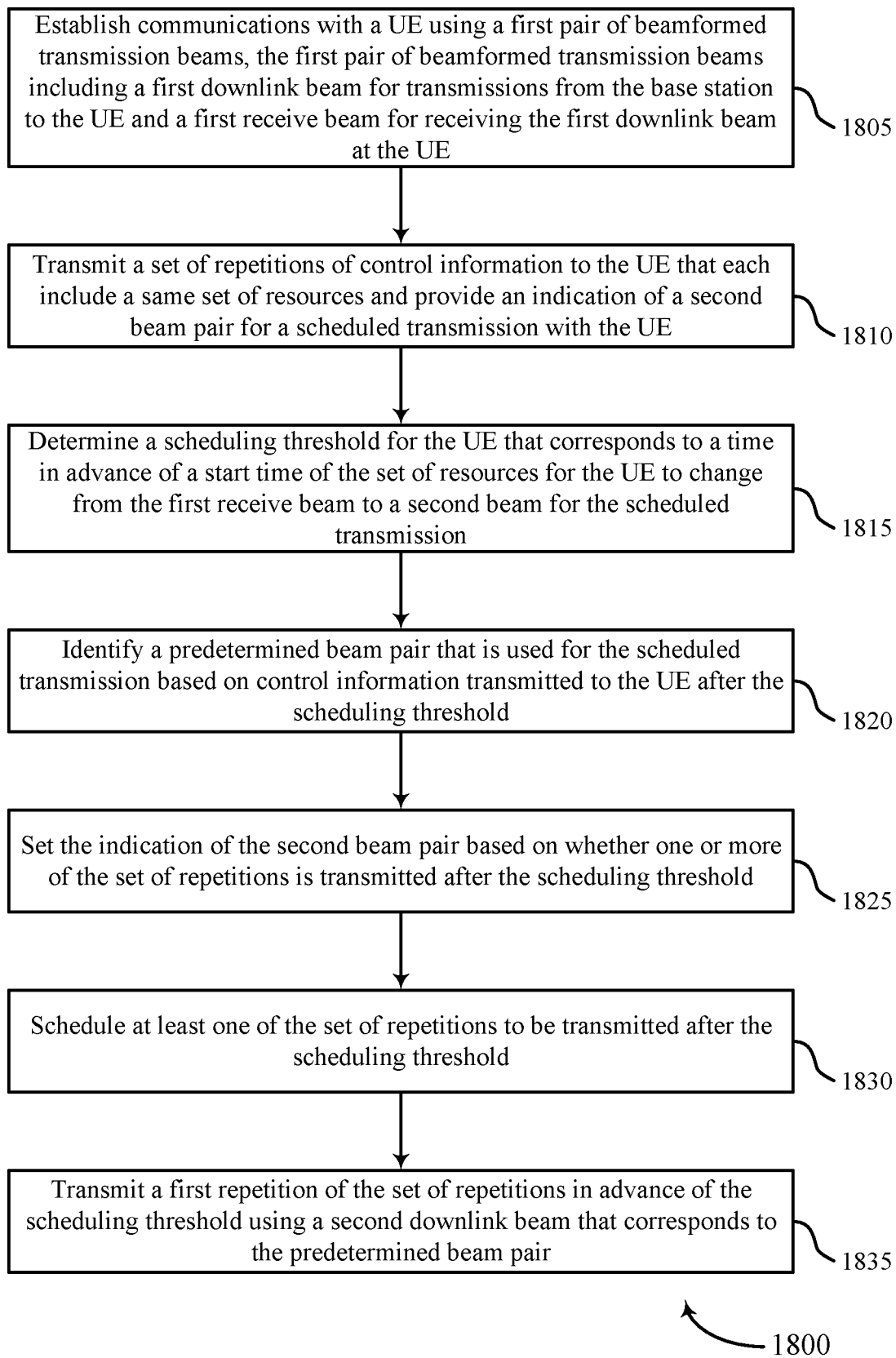

FIG. 18 shows a flowchart illustrating a method 1800 that supports beam determination techniques in beamformed wireless communications in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1805, the base station may establish communications with a UE using a first pair of beamformed transmission beams, the first pair of beamformed transmission beams including a first downlink beam for transmissions from the base station to the UE and a first receive beam for receiving the first downlink beam at the UE. The operations of 1805 may be performed according to the methods described herein. In some examples, aspects of the operations of 1805 may be performed by a connection establishment manager as described with reference to FIGS. 12 through 15.

At 1810, the base station may transmit a set of repetitions of control information to the UE that each include a same set of resources and provide an indication of a second beam pair for a scheduled transmission with the UE. The operations of 1810 may be performed according to the methods described herein. In some examples, aspects of the operations of 1810 may be performed by a repetition manager as described with reference to FIGS. 12 through 15.

At 1815, the base station may determine a scheduling threshold for the UE that corresponds to a time in advance of a start time of the set of resources for the UE to change from the first receive beam to a second beam for the scheduled transmission. The operations of 1815 may be performed according to the methods described herein. In some examples, aspects of the operations of 1815 may be performed by a scheduling threshold component as described with reference to FIGS. 12 through 15.

At 1820, the base station may identify a predetermined beam pair that is used for the scheduled transmission based on control information transmitted to the UE after the scheduling threshold. The operations of 1820 may be performed according to the methods described herein. In some examples, aspects of the operations of 1820 may be performed by a transmission beam manager as described with reference to FIGS. 12 through 15.

At 1825, the base station may set the indication of the second beam pair based on whether one or more of the set of repetitions is transmitted after the scheduling threshold. The operations of 1825 may be performed according to the methods described herein. In some examples, aspects of the operations of 1825 may be performed by a transmission beam manager as described with reference to FIGS. 12 through 15.

At 1830, the base station may schedule at least one of the set of repetitions to be transmitted after the scheduling threshold. The operations of 1830 may be performed according to the methods described herein. In some examples, aspects of the operations of 1830 may be performed by a scheduling manager as described with reference to FIGS. 12 through 15.

At 1835, the base station may transmit a first repetition of the set of repetitions in advance of the scheduling threshold using a second downlink beam that corresponds to the predetermined beam pair. The operations of 1835 may be performed according to the methods described herein. In some examples, aspects of the operations of 1835 may be performed by a transmission beam manager as described with reference to FIGS. 12 through 15.

Figure 19:
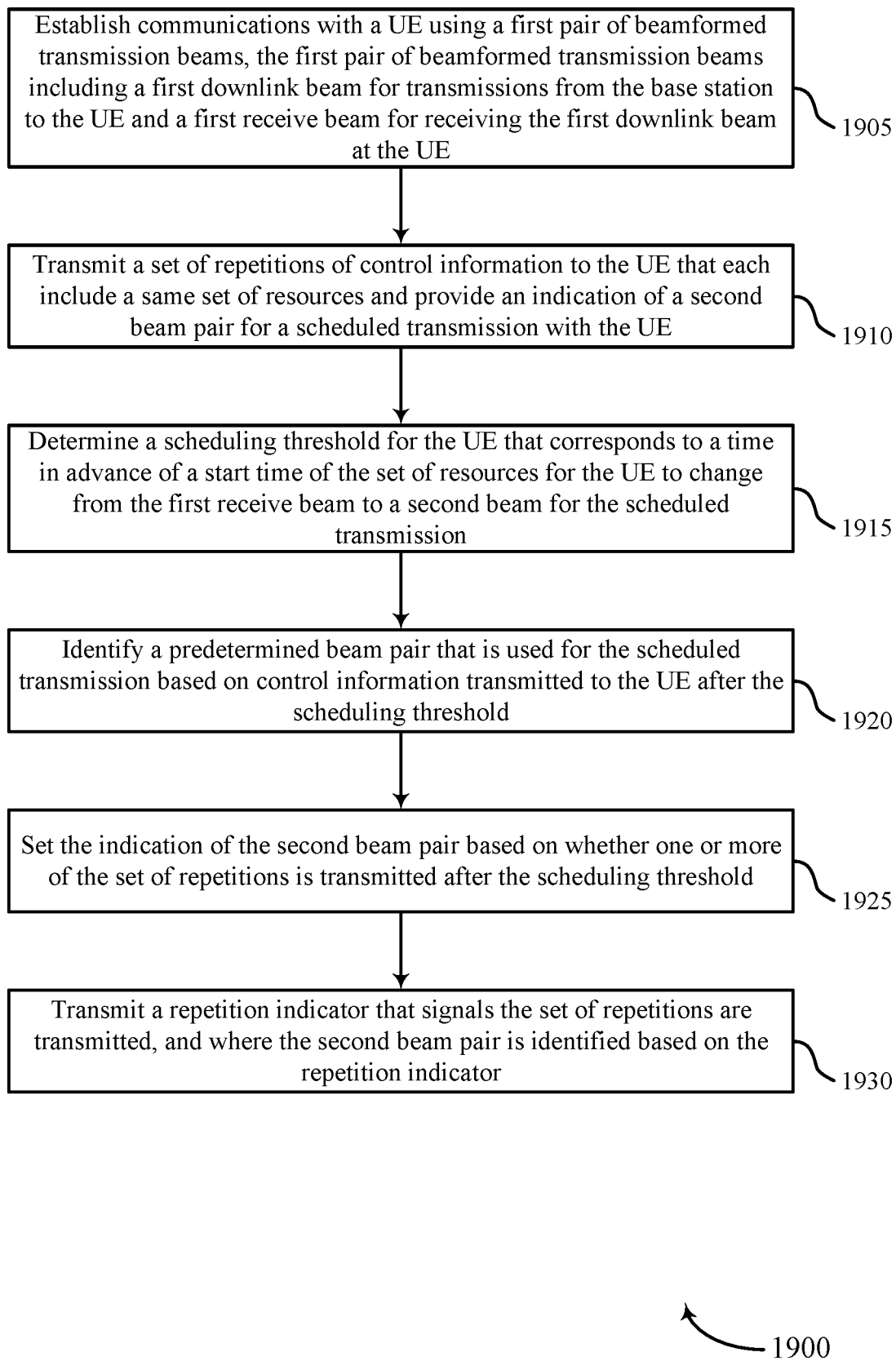

FIG. 19 shows a flowchart illustrating a method 1900 that supports beam determination techniques in beamformed wireless communications in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may establish communications with a UE using a first pair of beamformed transmission beams, the first pair of beamformed transmission beams including a first downlink beam for transmissions from the base station to the UE and a first receive beam for receiving the first downlink beam at the UE. The operations of 1905 may be performed according to the methods described herein. In some examples, aspects of the operations of 1905 may be performed by a connection establishment manager as described with reference to FIGS. 12 through 15.

At 1910, the base station may transmit a set of repetitions of control information to the UE that each include a same set of resources and provide an indication of a second beam pair for a scheduled transmission with the UE. The operations of 1910 may be performed according to the methods described herein. In some examples, aspects of the operations of 1910 may be performed by a repetition manager as described with reference to FIGS. 12 through 15.

At 1915, the base station may determine a scheduling threshold for the UE that corresponds to a time in advance of a start time of the set of resources for the UE to change from the first receive beam to a second beam for the scheduled transmission. The operations of 1915 may be performed according to the methods described herein. In some examples, aspects of the operations of 1915 may be performed by a scheduling threshold component as described with reference to FIGS. 12 through 15.

At 1920, the base station may identify a predetermined beam pair that is used for the scheduled transmission based on control information transmitted to the UE after the scheduling threshold. The operations of 1920 may be performed according to the methods described herein. In some examples, aspects of the operations of 1920 may be performed by a transmission beam manager as described with reference to FIGS. 12 through 15.

At 1925, the base station may set the indication of the second beam pair based on whether one or more of the set of repetitions is transmitted after the scheduling threshold. The operations of 1925 may be performed according to the methods described herein. In some examples, aspects of the operations of 1925 may be performed by a transmission beam manager as described with reference to FIGS. 12 through 15.

At 1930, the base station may transmit a repetition indicator that signals the set of repetitions are transmitted, and where the second beam pair is identified based on the repetition indicator. The operations of 1930 may be performed according to the methods described herein. In some examples, aspects of the operations of 1930 may be performed by a repetition manager as described with reference to FIGS. 12 through 15. In some cases, the repetition indicator is included with the control information in each of the set of repetitions. In some cases, the second beam pair is identified based on the repetition indicator irrespective of which of at least two different downlink beams provides the control information. In some cases, the second beam pair corresponds to a lowest beam pair ID in a CORESET associated with a prior transmission slot.

Figure 20:
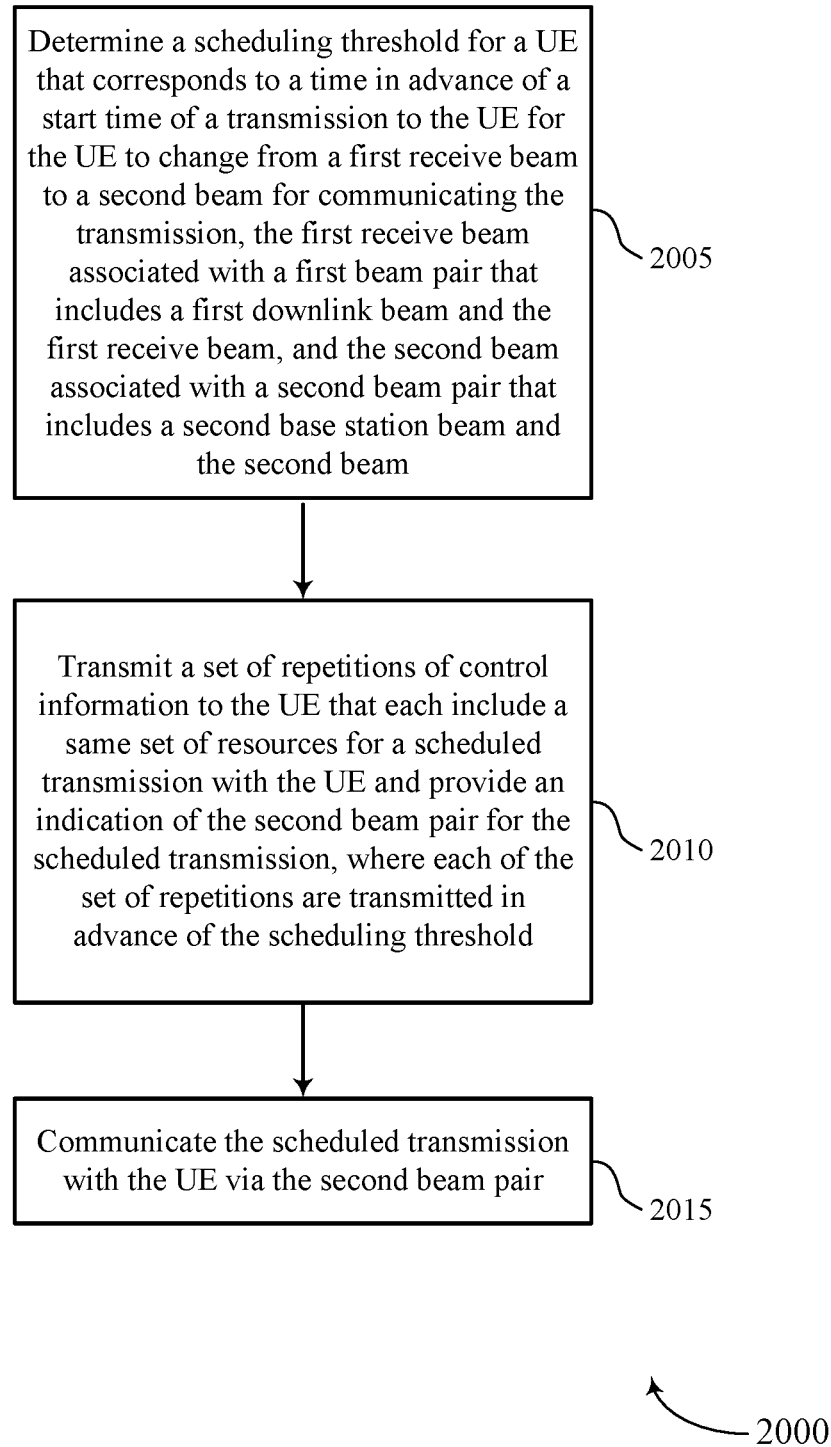

FIG. 20 shows a flowchart illustrating a method 2000 that supports beam determination techniques in beamformed wireless communications in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may determine a scheduling threshold for a UE that corresponds to a time in advance of a start time of a transmission to the UE for the UE to change from a first receive beam to a second beam for communicating the transmission, the first receive beam associated with a first beam pair that includes a first downlink beam and the first receive beam, and the second beam associated with a second beam pair that includes a second base station beam and the second beam. The operations of 2005 may be performed according to the methods described herein. In some examples, aspects of the operations of 2005 may be performed by a scheduling threshold component as described with reference to FIGS. 12 through 15.

At 2010, the base station may transmit a set of repetitions of control information to the UE that each include a same set of resources for a scheduled transmission with the UE and provide an indication of the second beam pair for the scheduled transmission, where each of the set of repetitions are transmitted in advance of the scheduling threshold. The operations of 2010 may be performed according to the methods described herein. In some examples, aspects of the operations of 2010 may be performed by a repetition manager as described with reference to FIGS. 12 through 15.

At 2015, the base station may communicate the scheduled transmission with the UE via the second beam pair. The operations of 2015 may be performed according to the methods described herein. In some examples, aspects of the operations of 2015 may be performed by a transmission beam manager as described with reference to FIGS. 12 through 15.

Figure 21:
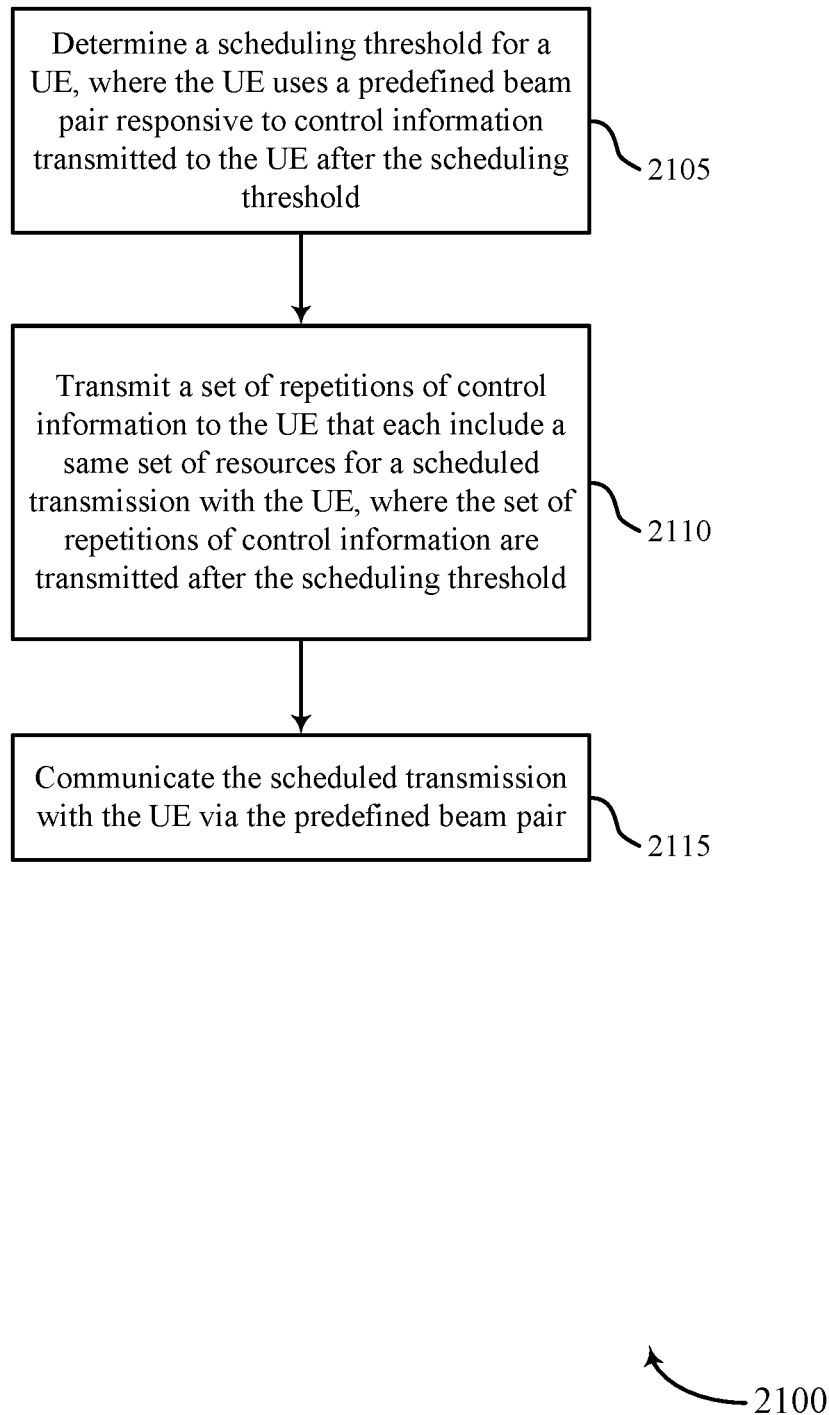

FIG. 21 shows a flowchart illustrating a method 2100 that supports beam determination techniques in beamformed wireless communications in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may determine a scheduling threshold for a UE that corresponds to a time in advance of a start time of a transmission to the UE for the UE to change from a first receive beam to a second receive beam for receiving the transmission, the first receive beam associated with a first beam pair that includes a first downlink beam and the first receive beam, and the second receive beam associated with a second beam pair that includes a second downlink beam and the second receive beam, and where the UE uses a predefined beam pair responsive to control information transmitted to the UE after the scheduling threshold. The operations of 2105 may be performed according to the methods described herein. In some examples, aspects of the operations of 2105 may be performed by a scheduling threshold component as described with reference to FIGS. 12 through 15.

At 2110, the base station may transmit a set of repetitions of control information to the UE that each include a same set of resources for a scheduled transmission with the UE, where the set of repetitions of control information are transmitted after the scheduling threshold. The operations of 2110 may be performed according to the methods described herein. In some examples, aspects of the operations of 2110 may be performed by a repetition manager as described with reference to FIGS. 12 through 15.

At 2115, the base station may communicate the scheduled transmission with the UE via the predefined beam pair. The operations of 2115 may be performed according to the methods described herein. In some examples, aspects of the operations of 2115 may be performed by a transmission beam manager as described with reference to FIGS. 12 through 15.

Figure 22:
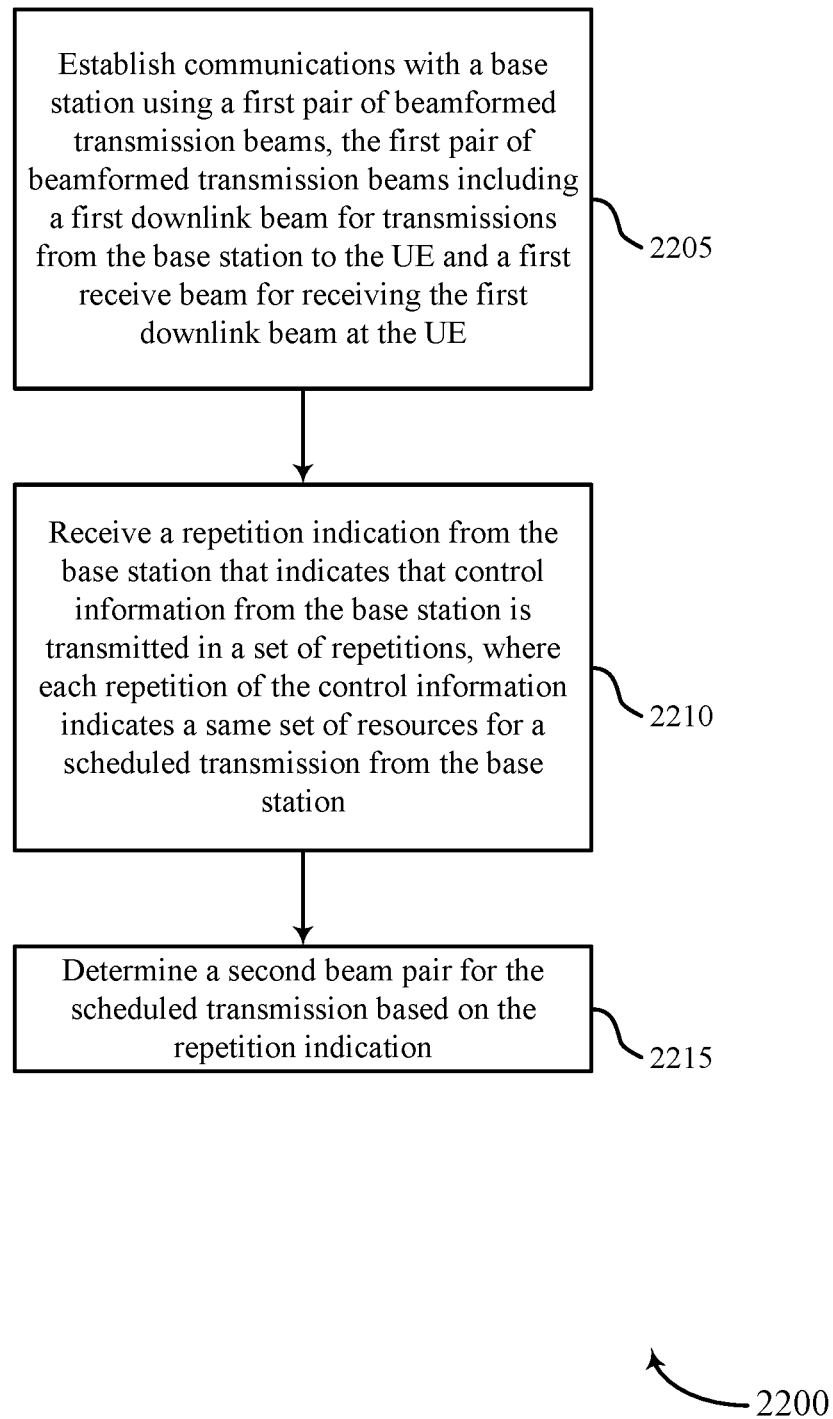

FIG. 22 shows a flowchart illustrating a method 2200 that supports beam determination techniques in beamformed wireless communications in accordance with aspects of the present disclosure. The operations of method 2200 may be implemented by a UE 115 or its components as described herein. For example, the operations of method 2200 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2205, the UE may establish communications with a base station using a first pair of beamformed transmission beams, the first pair of beamformed transmission beams including a first downlink beam for transmissions from the base station to the UE and a first receive beam for receiving the first downlink beam at the UE. The operations of 2205 may be performed according to the methods described herein. In some examples, aspects of the operations of 2205 may be performed by a connection establishment manager as described with reference to FIGS. 8 through 11.

At 2210, the UE may receive a repetition indication from the base station that indicates that control information from the base station is transmitted in a set of repetitions, where each repetition of the control information indicates a same set of resources for a scheduled transmission from the base station. The operations of 2210 may be performed according to the methods described herein. In some examples, aspects of the operations of 2210 may be performed by a repetition manager as described with reference to FIGS. 8 through 11.

At 2215, the UE may determine a second beam pair for the scheduled transmission based on the repetition indication. The operations of 2215 may be performed according to the methods described herein. In some examples, aspects of the operations of 2215 may be performed by a transmission beam manager as described with reference to FIGS. 8 through 11.

Figure 23:
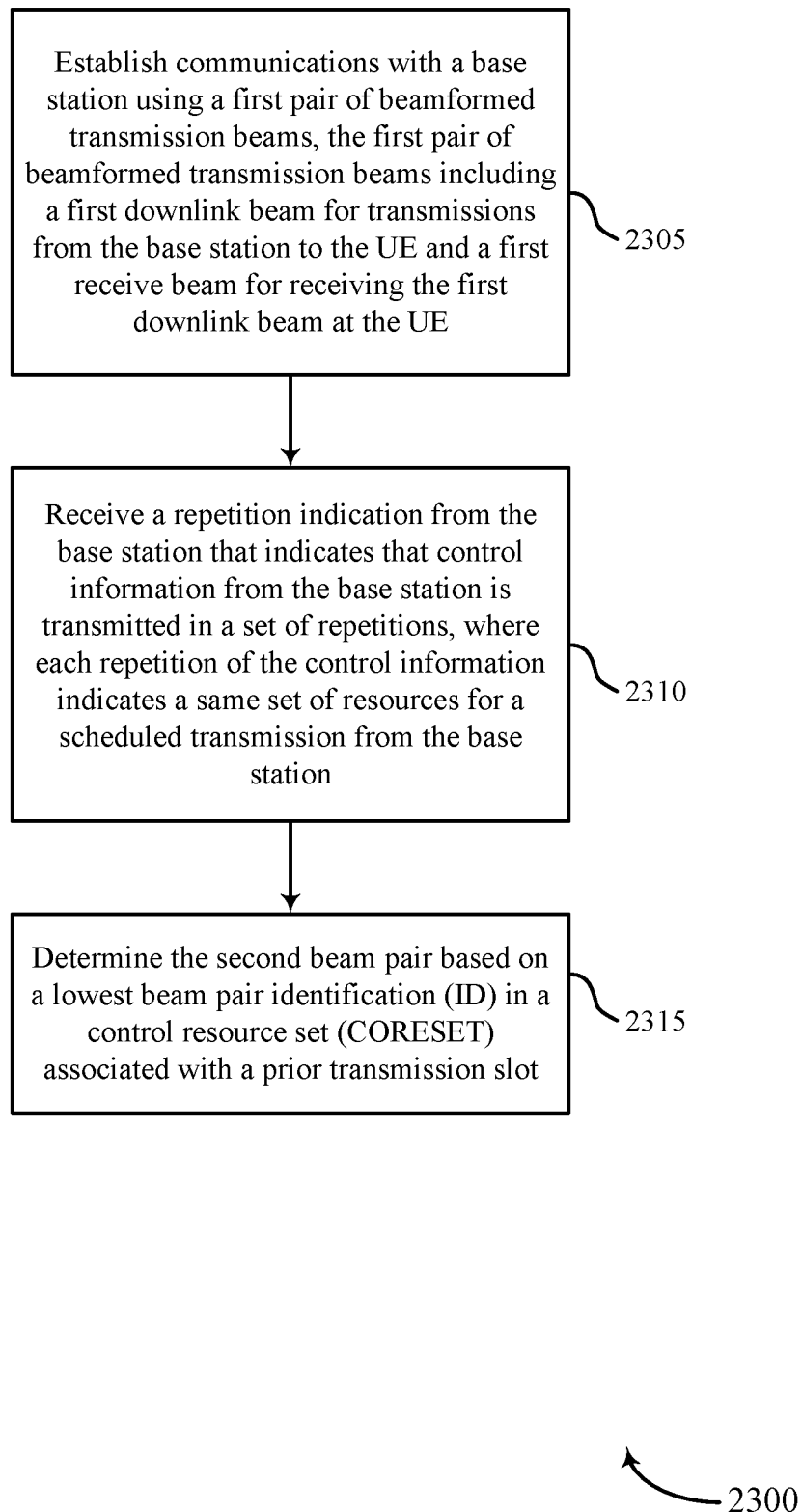

FIG. 23 shows a flowchart illustrating a method 2300 that supports beam determination techniques in beamformed wireless communications in accordance with aspects of the present disclosure. The operations of method 2300 may be implemented by a UE 115 or its components as described herein. For example, the operations of method 2300 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2305, the UE may establish communications with a base station using a first pair of beamformed transmission beams, the first pair of beamformed transmission beams including a first downlink beam for transmissions from the base station to the UE and a first receive beam for receiving the first downlink beam at the UE. The operations of 2305 may be performed according to the methods described herein. In some examples, aspects of the operations of 2305 may be performed by a connection establishment manager as described with reference to FIGS. 8 through 11.

At 2310, the UE may receive a repetition indication from the base station that indicates that control information from the base station is transmitted in a set of repetitions, where each repetition of the control information indicates a same set of resources for a scheduled transmission from the base station. The operations of 2310 may be performed according to the methods described herein. In some examples, aspects of the operations of 2310 may be performed by a repetition manager as described with reference to FIGS. 8 through 11.

At 2315, the UE may determine the second beam pair based on a lowest beam pair identification (ID) in a control resource set (CORESET) associated with a prior transmission slot. The operations of 2315 may be performed according to the methods described herein. In some examples, aspects of the operations of 2315 may be performed by a transmission beam manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1 X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
   establishing communications with a user equipment (UE) using a first pair of beamformed transmission beams, the first pair of beamformed transmission beams including a first downlink beam for transmissions from the base station to the UE and a first receive beam for receiving the first downlink beam at the UE;
   transmitting a first transmission associated with a first scheduling offset comprising a first repetition of a plurality of repetitions of control information to the UE, wherein the first repetition of the plurality of repetitions is transmitted in advance of a scheduling threshold;
   transmitting a second transmission associated with a second scheduling offset comprising a second repetition of the plurality of repetitions of the control information to the UE, the first repetition and the second repetition each including a same set of resources and providing an indication of a second beam pair for a scheduled transmission with the UE;
   determining the scheduling threshold for the UE that corresponds to a time in advance of a start time of the set of resources for the UE to change from the first receive beam to a second beam for the scheduled transmission;
   identifying a predetermined beam pair that is used for the scheduled transmission based on control information transmitted to the UE after the scheduling threshold; and
   setting the indication of the second beam pair based at least in part on whether one or more of the plurality of repetitions is transmitted after the scheduling threshold.

2. The method of claim 1, wherein the plurality of repetitions of control information are transmitted using at least two different downlink beams.

3. The method of claim 1, further comprising:
   scheduling at least one of the plurality of repetitions to be transmitted after the scheduling threshold; and
   setting the indication of the second beam pair to be the predetermined beam pair.

4. The method of claim 3, wherein the predetermined beam pair corresponds to a lowest beam pair identification (ID) in a control resource set (CORESET) associated with a prior transmission slot.

5. The method of claim 1, wherein the indication of the second beam pair for the scheduled transmission is based on a downlink beam used to transmit the control information, and wherein the method further comprises:
scheduling at least one of the plurality of repetitions to be transmitted after the scheduling threshold.

6. The method of claim 1, further comprising:
transmitting a repetition indicator that signals the plurality of repetitions are transmitted, and wherein the second beam pair is identified based at least in part on the repetition indicator.

7. The method of claim 6, wherein the repetition indicator is included with the control information in each of the plurality of repetitions.

8. The method of claim 6, wherein the second beam pair is identified based at least in part on the repetition indicator irrespective of which downlink beam provides the control information.

9. The method of claim 6, wherein the second beam pair corresponds to a lowest beam pair identification (ID) in a control resource set (CORESET) associated with a prior transmission slot.

10. The method of claim 1, wherein the scheduled transmission comprises one or more physical downlink shared channel (PDSCH) transmissions, one or more aperiodic channel state information reference signal (AP-CSI-RS) transmissions, or combinations thereof.

11. The method of claim 1, wherein the scheduling threshold is determined based at least in part on a capability of the UE provided in a UE capability report.

12. A method for wireless communication at a base station, comprising:
establishing communications with a user equipment (UE) using a first beam pair that includes a first downlink beam for transmissions from the base station to the UE and a first receive beam for receiving the first downlink beam at the UE;
determining, based at least in part on establishing the communications, a scheduling threshold for UE that corresponds to a time in advance of a start time of a transmission to the UE for the UE to change from the first receive beam to a second beam for communicating the transmission, and the second beam associated with a second beam pair that includes a second base station beam and the second beam;
transmitting a first transmission associated with a first scheduling offset comprising a first repetition of a plurality of repetitions of control information to the UE;
transmitting a second transmission associated with a second scheduling offset comprising a second repetition of the plurality of repetitions of the control information to the UE, the first repetition and the second repetition each including a same set of resources for a scheduled transmission with the UE and providing an indication of the second beam pair for the scheduled transmission, wherein each of the plurality of repetitions are transmitted in advance of the scheduling threshold; and
communicating the scheduled transmission with the UE via the second beam pair.

13. The method of claim 12, wherein the indication for the second beam pair is based at least in part on a downlink beam that provides control information, wherein the second beam pair corresponds to a beam pair that corresponds to or is quasi-co-located (QCL) with the downlink beam that provides the control information.

14. The method of claim 12, wherein each of the plurality of repetitions of control information are transmitted within a same transmission slot.

15. The method of claim 12, wherein:
two or more of the plurality of repetitions of control information are transmitted in different transmission slots and each provide the indication of the second beam pair.

16. The method of claim 12, wherein the plurality of repetitions of control information are transmitted using at least two different downlink beams, and wherein the indication for the second beam pair is an explicit indication of the second beam pair.

17. A method for wireless communication at a base station, comprising:
establishing communications with a user equipment (UE) using a first beam pair that includes a first downlink beam for transmissions from the base station to the UE and a first receive beam for receiving the first downlink beam at the UE;
determining, based at least in part on establishing the communications, a scheduling threshold for UE that corresponds to a time in advance of a start time of a transmission to the UE for the UE to change from the first receive beam to a second receive beam for communicating the transmission, and the second receive beam associated with a second beam pair that includes the second beam and a second base station beam, and wherein the UE uses a predefined beam pair responsive to control information transmitted to the UE after the scheduling threshold;
transmitting a first transmission associated with a first scheduling offset comprising a first repetition of a plurality of repetitions of control information to the UE;
transmitting a second transmission associated with a second scheduling offset comprising a second repetition of the plurality of repetitions of the control information to the UE, the first repetition and the second repetition each including a same set of resources for a scheduled transmission with the UE, wherein the plurality of repetitions of control information are transmitted after the scheduling threshold; and
communicating the scheduled transmission with the UE via the predefined beam pair.

18. The method of claim 17, wherein each of the plurality of repetitions of control information are transmitted within a same transmission slot.

19. The method of claim 17, wherein the predefined beam pair corresponds to a lowest beam identification (ID) in a control resource set (CORESET) associated with a prior transmission slot.

20. The method of claim 17, wherein:
the UE selects the second receive beam based on a second downlink beam being used to transmit the control information when the control information is transmitted prior to the scheduling threshold; and
ambiguity associated with two or more different downlink beams used to transmit the plurality of repetitions is removed based on each of the plurality of repetitions being transmitted after the scheduling threshold.

21. The method of claim 17, wherein the plurality of repetitions of control information are transmitted using at least two different downlink beams.

22. The method of claim 17, wherein the scheduled transmission comprises one or more physical downlink shared channel (PDSCH) transmissions, one or more aperiodic channel state information reference signal (AP-CSI-RS) transmissions, or combinations thereof.

23. An apparatus for wireless communication at a base station, comprising: a processor, memory in electronic communication with the processor; and instructions stored in the memory and executable by the processor to cause the apparatus to:
   establish communications with a user equipment (UE) using a first pair of beamformed transmission beams, the first pair of beamformed transmission beams including a first downlink beam for transmissions from the base station to the UE and a first receive beam for receiving the first downlink beam at the UE;
   transmit a first transmission associated with a first scheduling offset comprising a first repetition of a plurality of repetitions of control information to the UE, wherein the first repetition of the plurality of repetitions is transmitted in advance of a scheduling threshold;
   transmit a second transmission associated with a second scheduling offset comprising a second repetition of the plurality of repetitions of the control information to the UE, the first repetition and the second repetition each including a same set of resources and providing an indication of a second beam pair for a scheduled transmission with the UE;
   determine the scheduling threshold for the UE that corresponds to a time in advance of a start time of the set of resources for the UE to change from the first receive beam to a second beam for the scheduled transmission;
   identify a predetermined beam pair that is used for the scheduled transmission based on control information transmitted to the UE after the scheduling threshold; and
   set the indication of the second beam pair based at least in part on whether one or more of the plurality of repetitions is transmitted after the scheduling threshold.

24. The apparatus of claim 23, wherein the plurality of repetitions of control information are transmitted using at least two different downlink beams.

25. The apparatus of claim 23, wherein the instructions are further executable by the processor to cause the apparatus to:
   schedule at least one of the plurality of repetitions to be transmitted after the scheduling threshold; and
   set the indication of the second beam pair to be the predetermined beam pair.

26. The apparatus of claim 25, wherein the predetermined beam pair corresponds to a lowest beam pair identification (ID) in a control resource set (CORESET) associated with a prior transmission slot.

27. The apparatus of claim 23, wherein the indication of the second beam pair for the scheduled transmission is based on a downlink beam used to transmit the control information, and wherein the instructions are further executable by the processor to cause the apparatus to:
   schedule at least one of the plurality of repetitions to be transmitted after the scheduling threshold.

28. The apparatus of claim 23, wherein the instructions are further executable by the processor to cause the apparatus to:
   transmit a repetition indicator that signals the plurality of repetitions are transmitted, and wherein the second beam pair is identified based at least in part on the repetition indicator.

29. The apparatus of claim 28, wherein the second beam pair is identified based at least in part on the repetition indicator irrespective of which downlink beam provides the control information.

30. The apparatus of claim 23, wherein the scheduled transmission comprises one or more physical downlink shared channel (PDSCH) transmissions, one or more aperiodic channel state information reference signal (AP-CSI-RS) transmissions, or combinations thereof.

* * * * *